(12) United States Patent
Fernandes Barros

(10) Patent No.: US 8,929,490 B1
(45) Date of Patent: Jan. 6, 2015

(54) METHODS AND SYSTEMS FOR LOW LATENCY AND LOW POWER TRIGGER DETECTION FOR CONNECTING WIRELESS DEVICES

(71) Applicant: QUALCOMM Incorporated, San Diego, CA (US)

(72) Inventor: Daniel Jose Fernandes Barros, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/034,246

(22) Filed: Sep. 23, 2013

(51) Int. Cl.
*H03D 1/00* (2006.01)
*H04L 27/06* (2006.01)
*H04W 52/02* (2009.01)
*H04W 4/00* (2009.01)

(52) U.S. Cl.
CPC .......... *H04W 52/0229* (2013.01); *H04W 4/008* (2013.01)
USPC ............ 375/343; 375/286; 375/287; 375/316

(58) Field of Classification Search
CPC ...... H04B 1/707; H04B 1/709; H04L 1/0054; H04L 1/005; H04L 27/2647; H04L 7/042
USPC .......................... 375/142, 262, 316, 341, 343
See application file for complete search history.

(56) References Cited

U.S. PATENT DOCUMENTS

| | | | |
|---|---|---|---|
| 7,181,204 B2 | 2/2007 | Alfano et al. | |
| 7,453,853 B2 | 11/2008 | Haartsen | |
| 7,466,667 B2 | 12/2008 | Jones, IV et al. | |
| 8,401,001 B2 | 3/2013 | Adamovsky et al. | |
| 2002/0131441 A1* | 9/2002 | Trachewsky et al. | 370/441 |
| 2006/0008035 A1* | 1/2006 | Larsson | 375/343 |
| 2008/0116969 A1* | 5/2008 | Kubota et al. | 329/304 |
| 2011/0053588 A1 | 3/2011 | Al-Khudairi et al. | |
| 2011/0150066 A1* | 6/2011 | Fujimoto | 375/224 |

* cited by examiner

*Primary Examiner* — Ted Wang
(74) *Attorney, Agent, or Firm* — Knobbe Martens Olson & Bear LLP

(57) ABSTRACT

Systems and apparatus are disclosed for a target device to detect a trigger from an initiating device. One implementation includes a wireless device configured to correlate a received waveform with a target waveform, compare a result of the correlation to a threshold and output a first signal based on the comparison of the result and the threshold. The apparatus may also be configured to generate a sequence of bits by demodulating at least a portion of the received waveform in response to receiving the first signal, to compare in parallel a plurality of circularly rotated versions of a target sequence of bits with the demodulated sequence of bits, and to combine the results of the comparisons and output a second signal when the combined comparisons indicate that the demodulated sequence of bits corresponds to the target sequence of bits.

31 Claims, 15 Drawing Sheets

METHODS AND SYSTEMS FOR LOW LATENCY AND LOW POWER TRIGGER DETECTION FOR CONNECTING WIRELESS DEVICES

FIELD

This application relates generally to wireless communications, and more specifically to systems and methods for connecting wireless devices.

BACKGROUND

Wireless devices within communication range may establish connections to communicate. For an initiator device to initiate communication with a target device, particularly when there may be other devices within communication range, the initiator repeatedly transmits a trigger waveform addressed to the target. Each of the devices in range of the initiator device may receive and detect the trigger waveform, but only the target device with an address that matches an address in the trigger waveform determines that the trigger waveform is addressed to the target device. The target device may then respond to the initiator device to establish a connection (or a reconnection). The other wireless devices that are not addressed by the trigger waveform ignore the trigger waveform. This approach of trigger detection for connecting wireless devices may be used for both connecting devices and re-connecting devices by various wireless protocols, including Bluetooth and Wi-Fi.

Scanning for trigger waveforms, and determining if received waveforms are addressed to a particular device which receives the trigger waveform, consumes power. Mobile wireless devices have limited battery life. Inventions that would speed connection, and reconnection, of wireless devices would reduce power consumption by the wireless devices. Accordingly, new systems and methods are needed to reduce latency of determining if a trigger waveform has been received for a particular wireless device and to reduce power required for trigger detection to connect and reconnect wireless devices.

SUMMARY OF THE INVENTION

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include allowing for multicasting using Bluetooth wireless technologies.

One innovation of the disclosure provides an apparatus for wireless communication. In some implementations the apparatus includes a correlation circuit configured to correlate a received waveform with a target waveform, the correlation circuit further configured to compare a result of the correlation to a threshold and output a first signal when the result of the correlation exceeds the threshold. In some implementations, the apparatus includes a demodulation circuit configured to generate a sequence of bits by demodulating at least a portion of the received waveform in response to receiving the first signal. In some implementations, the apparatus includes a comparison circuit configured to compare, in parallel, a plurality of circularly rotated versions of a target sequence of bits with the demodulated sequence of bits. In some implementations, the apparatus includes a trigger detection circuit configured to combine the results of the comparisons and output a second signal when the combined comparisons indicate that the demodulated sequence of bits corresponds to the target sequence of bits.

In various implementations of an apparatus, processor, method or computer readable medium, the comparison circuit is configured to compare, in parallel, circularly rotated versions of the target sequences of bits rotated by a shift value resulting from an integer multiple of the length of the target sequence of bits divided by the number of rotated versions of the target sequence of bits. In various implementations of an apparatus, processor, method or computer readable medium, the comparison circuit comprises a comparator configured to compare each of the plurality of circularly rotated versions of the target sequence of bits with the demodulated sequence of bits. In various implementations of an apparatus, processor, method or computer readable medium, the comparison circuit comprises a plurality of comparators, wherein each of the plurality of comparators compares a circularly rotated version of the target sequence of bits with the demodulated bits.

In various implementations of an apparatus, processor, method or computer readable medium, the correlation circuit comprises a plurality of correlators, wherein each of the plurality of correlators correlates a circularly rotated version of the target waveform with the received waveform. In various implementations of an apparatus, processor, method, or computer readable medium, each correlator of the plurality of correlators correlates the received waveform with a circularly rotated version of the targeted waveform, wherein the circularly rotated waveforms are rotated by an integer multiple of the length of the target waveform divided by the number of correlators.

In some implementations, the apparatus further includes a scanning circuit that scans a plurality of carrier frequencies during a time window for a trigger waveform, the scanning circuit further configured to receive a waveform centered at one of the carrier frequencies. In some implementations, the apparatus further includes a transmitter configured to transmit a beacon in response to the second signal.

In various implementations of an apparatus, processor, method or computer readable medium, the received waveform conforms to a wireless communications protocol wherein a trigger waveform from an initiator device to a target device is repeatedly transmitted. In various implementations of an apparatus, processor, method or computer readable medium, the wireless communications protocol is Bluetooth or Wi-Fi.

In various implementations of an apparatus, processor, method or computer readable medium, the target sequence of bits corresponds to a sequence of low latency reconnection bits associated with the apparatus. In various implementations of an apparatus, processor, method or computer readable medium, the target sequence of bits comprises 32 bits. In various implementations of an apparatus, processor, method or computer readable medium, the comparison circuit is configured to compare four rotated versions of the target sequence with the demodulated bits.

One innovation of the disclosure provides a method for wireless communications. In some implementations, the method includes correlating a received waveform with a target waveform to generate a correlation result. In some implementations, the method includes comparing the correlation result to a threshold. In some implementations, if the correlation result exceeds the threshold, the method includes demodulating at least a portion of the waveform to generate a sequence of bits. In some implementations, the method includes comparing, in parallel, a plurality of circularly rotated versions of a target sequence of bits with the demodulated sequence of bits to generate a comparison result. In some implementations, the method includes outputting a signal indicating a match between the target sequence of bits and the demodulated sequence of bits.

For some implementations of a method, apparatus, processor, or computer readable medium, comparing a plurality of rotated versions of the target sequences of bits with the demodulated sequence of bits comprises comparing rotated versions that are rotated by an integer multiple of the length of the target sequence of bits divided by the number of rotated versions of the target sequence of bits. For some implementations of a method, apparatus, processor, or computer readable medium, correlating the received waveform with the target waveform comprises correlating a plurality of circularly rotated versions of the target waveform with the received waveform.

For some implementations of a method, the method includes scanning a plurality of carrier frequencies during a time window for a trigger waveform; and receiving a waveform centered at one of the carrier frequencies. For some implementations of a method, the method includes transmitting a beacon in response to the signal. For some implementations of a method, apparatus, processor, or computer readable medium, the received waveform conforms to a wireless communications protocol wherein a trigger waveform from an initiator device to a target device is repeatedly transmitted.

One innovation of the disclosure provides an apparatus for wireless communication. For some implementation the apparatus includes means for correlating a received waveform with a target waveform to generate a correlation result. For some implementations the apparatus includes means for comparing the correlation result to a threshold. For some implementations the apparatus includes means for outputting a first signal indicating that the correlation result exceeds the threshold. For some implementations the apparatus includes means for generating a sequence of bits, comprising a means for demodulating at least a portion of the received waveform based on the first signal. For some implementations the apparatus includes means for comparing, in parallel, a plurality of circularly rotated versions of a target sequence of bits with the demodulated sequence of bits to generate a comparison result. For some implementations the apparatus includes means for outputting a second signal indicating a match between the target sequence of bits and the demodulated sequence of bits.

For some implementations, the correlating means comprises a correlation circuit, the correlation result comparing means comprises the correlation circuit; the first signal outputting means comprises the correlation circuit; the generating means comprises a demodulation circuit; the demodulating means comprises the demodulation circuit; the parallel comparing means comprises a comparison circuit; and the outputting means comprises a trigger detection circuit. For some implementations the apparatus includes means for scanning configured to scan a plurality of carrier frequencies during a time window for a trigger waveform and receive a waveform centered at one of the carrier frequencies.

One innovation of the disclosure provides a computer program product comprising a computer readable storage device encoded thereon with instructions that when executed cause an apparatus to perform a method of determining if a certain signal has been received. For some implementations, the method includes correlating a received waveform with a target waveform to generate a correlation result. For some implementations the method includes comparing the correlation result to a threshold. For some implementations, if the correlation result exceeds the threshold, the method includes demodulating at least a portion of the waveform to generate a sequence of bits. For some implementations, the method includes comparing, in parallel, a plurality of circularly rotated versions of a target sequence of bits with the demodulated sequence of bits to generate a comparison result. For some implementations the method includes outputting a second signal indicating a match between the target sequence of bits and the demodulated sequence of bits.

One innovation of the disclosure provides a processor configured to determine if a certain signal has been received. For some implementations, the processor includes a correlation circuit configured to correlate a received waveform with a target waveform, the correlation circuit further configured to compare a result of the correlation to a threshold and output a first signal when the result of the correlation exceeds the threshold. For some implementations, the processor includes a demodulation circuit configured to generate a sequence of bits by demodulating at least a portion of the received waveform in response to receiving the first signal. For some implementations, the processor includes a comparison circuit configured to compare, in parallel, a plurality of circularly rotated versions of a target sequence of bits with the demodulated sequence of bits. For some implementations, the processor includes a trigger detection circuit configured to combine the results of the comparisons and output a second signal when the combined comparisons indicate that the demodulated sequence of bits corresponds to the target sequence of bits.

DETAILED DESCRIPTION OF CERTAIN EMBODIMENTS

Figure 1:
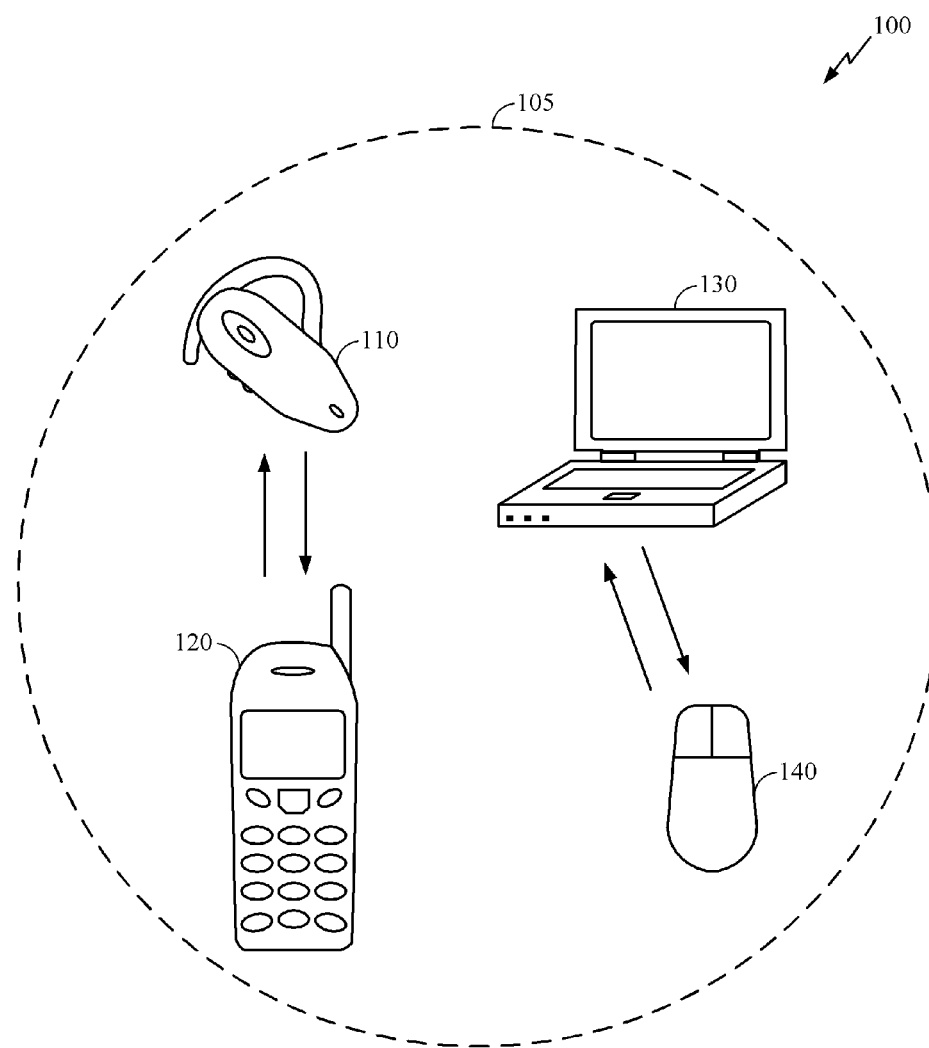
FIG. 1 illustrates pairs of communicating wireless devices.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The examples of systems and methods described herein are described with respect to Bluetooth wireless technologies. In particular, the systems and methods may be particularly relevant to portions of the Bluetooth V4.0 standard. However, one of ordinary skill in the art will recognize that the systems and methods may also be relevant to other similar wireless technologies (for example, Wi-Fi) and other versions of the Bluetooth standard. Further details about the Bluetooth standard may be found in Bluetooth Specification Version 4.0, published Jun. 30, 2010.

Further, the systems and methods described herein may be implemented on a variety of different computing devices. These include general purpose or special purpose computing system environments or configurations. Examples of computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. Further, the systems and methods may be implemented in mobile devices (e.g., phones, smartphones, Personal Digital Assistants (PDAs), Ultra-Mobile Personal Computers (UMPCs), Mobile Internet Devices (MIDs), etc.).

Wireless devices within communication range establish connections to communicate. The initiator device may repeatedly transmit a trigger waveform addressed to the target device. A device receiving the trigger waveform detects which trigger waveforms are meant for it by determining if the trigger waveform includes an address that matches the receiving devices address. When the addresses match, the target device responds to the initiator device to establish connection. Other devices not addressed by the trigger waveform ignore the trigger waveform. Scanning for trigger waveforms and determining if the waveform is addressed to a device takes time and power. The innovations of this disclosure include multiple aspects of systems and methods to reduce time, power, or cost required for trigger detection. Implementations of these innovations are disclosed herein. While in some cases these innovations are described as various implementations, certain aspects of these innovations may be combined in various implementations and any separate description is not meant to limit combining these aspects and innovations For example, one aspect is to limit the number of carrier frequencies for transporting trigger waveforms so that target devices only need to scan a few frequencies instead of many. As used herein, "low latency reconnection" is used a broad term to indicate low latency (short time delay) connections or reconnections. Lower latencies are often associated with lower power consumption. In some implementations, for Bluetooth low latency reconnection (BT LLR), a wireless device operating to detect wireless signals (sometimes referred to herein as a "listening device") may scan three carrier frequencies instead of the full set of over fifty carrier frequencies. A second aspect is to periodically scan for short periods of time, instead of scanning continuously. For BT LLR, in some implementations a wireless device operating to detect signals may scan all three carrier frequencies in 1.25 ms (for example, two (2) time slots), and then sleep in a reduced power state for over twenty (20) or more time slots. A wireless device configured to operate using one or both of these aspects can save scanning time and power.

When a listening device receives a trigger waveform, the listening device may receive the trigger waveform someplace other than the start of trigger waveform, for example, at the beginning, middle, or end of the trigger waveform. To efficiently detect that a received signal includes a trigger waveform for the particular listening device, the listening device may correlate the received waveform with circularly rotated versions of its target waveform. For example, for a 32 symbol trigger waveform, the first version of the target waveform may correspond to symbols 1-32, the second circularly rotated version may correspond to symbols 2-32 followed by symbol 1, the third version may correspond to symbols 3-32 followed by symbols 1-2, and the $18^{th}$ version may correspond to symbols 18-32 followed by symbols 1-17. Accordingly, a single correlator may require 32 versions to find the match, performing correlations 32 times, each time shifting the received trigger waveform by 1 symbol. Another aspect of the innovation uses multiple correlators operating in parallel to correlate the circularly rotated versions of the received trigger waveforms. For example, each of four correlators could correlate eight versions of a received trigger waveform in parallel, each correlator shifting the received trigger waveform by 1 symbol for each correlation. Accordingly, this aspect may reduce the time it takes to correlate a received waveform with all the versions of the target waveform by a factor of four, for this example with four correlators. Different implementations may use more or fewer correlators.

Another aspect of the innovation is to use a single physical correlator, instead of multiple physical correlators, to correlate multiple versions of the target waveform with the received waveform. This may be thought of as parallel operation or time sharing because the single physical correlator correlates multiple versions of the target waveform, for example, concurrently or nearly so. For example, if the single physical correlator can correlate at at least four times the rate as the incoming waveform, then the correlator can switch among the incoming waveform and correlate four versions of the target waveform as it is received. Because of the higher rate of correlation than of the incoming waveform, the physical correlator effectively correlates the four versions of the target waveform with the received waveform in parallel, using time sharing. This implementation may reduce hardware costs and complexity at least because it may take less physical space on a chip to implement.

Trigger waveforms communicate the target device address in a modulated waveform on a carrier frequency. Demodulating the received waveform results in demodulated bits independent of which of the carrier frequencies was used to transmit the trigger waveform. Another aspect includes to only demodulate received waveforms that are potential matches, as determined by correlating the received waveform with the target waveform. This aspect reduces power used to detect trigger waveforms.

In certain implementations, after demodulating a received trigger waveform, a listening device compares the received demodulated bits with its address, for the listening device's target sequence of bits. The received demodulated bits may not be aligned with the target sequence, so the listening device may be configured to compare circularly rotated versions of its target sequence of bits to the received demodulated sequence of bits. For example, for a 32 bit address, the first version of the target sequence may correspond to bits 1-32, the second circularly rotated version may correspond to bits 2-32 followed by bit 1, the third version bits 3-32 followed by bits 1-2, and the 18$^{th}$ version bits 18-32 followed by bits 1-17. A single shifting comparator may require 32 versions to find the version that matches the listening device's address. Accordingly, in another aspect of this innovation a wireless device uses multiple shifting comparators that are operating in parallel to compare circularly rotated versions of the demodulated bit sequence. For example, each of four comparators could compare eight versions in parallel. This aspect reduces the time it takes to compare the demodulated bits from a received waveform with all the versions of the target sequence of bits by up to a factor of four, for this example with four correlators.

Another aspect of this innovation is to use a single physical comparator to compare multiple versions of the target sequence of bits with the received sequence of bits, instead of multiple physical comparators. This may be thought of as parallel operation or time sharing because the single physical comparator compares multiple versions of the target bit sequence concurrently. For example, if the single physical comparator can correlate at at least four times the rate that the demodulator generates bit sequences, then the comparator can switch among and compare four versions of the target sequence of bits as they are received. Because of the higher rate of comparison than the rate of demodulating bits, the physical comparator effectively compares the four versions of the target waveform with the received waveform in parallel, using time sharing. Such an implementation may also reduce hardware costs and complexity of design and manufacturing.

These implementations and aspects described herein apply to connecting or reconnecting devices for wireless protocols wherein a trigger waveform is sent repeatedly by an initiator to a listening device that is a target device. Different implementations may incorporate different subsets of these aspects just described. For example, an embodiment may include both parallel comparison and parallel correlation—or just parallel comparison, or just parallel correlation.

FIG. 1 depicts two pairs of communicating wireless devices operating in an area 105. The cell phone 120 and ear piece 110 communicate with each other using Bluetooth communications, and the laptop 130 and mouse 140 wirelessly communicate with each other using Bluetooth. The cell phone 120, ear piece 110, laptop 130, and mouse 140 are in Bluetooth communications range of each other. Not shown are other wireless or wired connections to devices outside of area 105. For example, the laptop 130 may be communicating with the Internet using Wi-Fi, or the cell phone 120 may be communicating with another cell phone located in a distant area via a cell phone network. So that the earpiece 110 and the cell phone 120 connect properly for wireless communication, and the mouse 140 and the laptop 130 connect properly for wireless communication, one of each of the pair of devices (sometimes referred to herein as the "initiator") transmits a signal (or example a trigger waveform) to be received and processed by the other device in the pair (sometimes referred to herein as the "target"), the signal including information representing the target's address (for example, an identifier associated with the target). The other devices in the area 105 may also receive and process the signal but only one device (the target) will have an address that matches the address in the signal.

Figure 2:
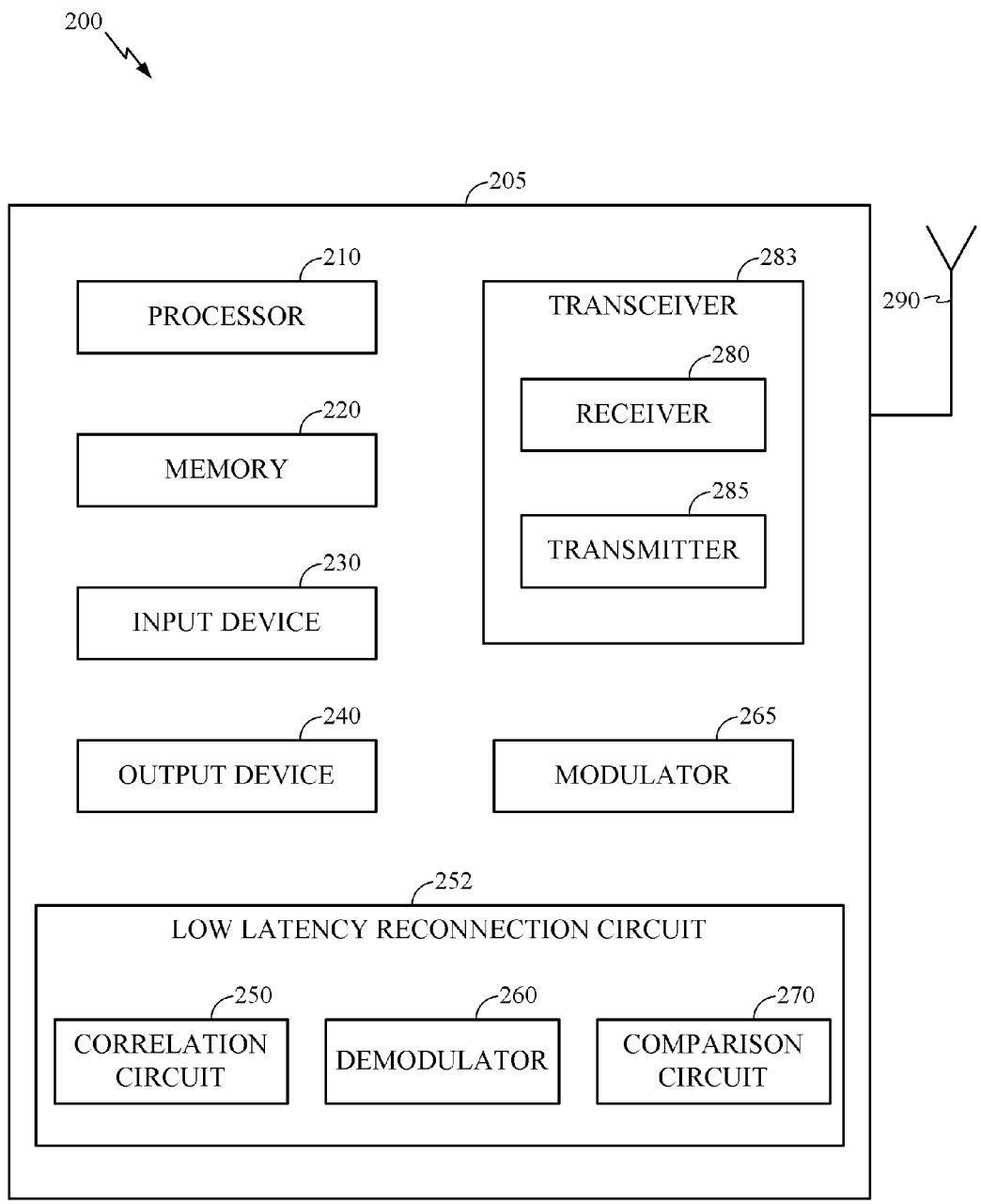
FIG. 2 illustrates a block diagram of a wireless device configured to detect a trigger waveform.

FIG. 2 illustrates a block diagram of an example of an implementation of a wireless device 200 that is configured to detect a trigger waveform. Cell phone 120, ear piece 110, laptop 130, and mouse 140 are non-limiting examples of wireless device 200. Wireless device 200 may include a housing 205 surrounding most or all of its operational components. Wireless device 200 may also include a processor 210 operationally coupled to a memory unit 220. The memory unit 220 as referred to herein may be incorporated on the same chip as the processor 210, or be components of memory included on the processor 210 and a separate component. The wireless device 200 may also include an input device 230, for example, a button, switch, or a structure that accepts an input via contact or near contact (for example a touchscreen). The wireless device 200 may also include an output device 240, for example a display screen. In some implementations, the wireless device 200 may not have an output device 240 (for example, a mouse), instead its output being indicated on another device (for example, the screen of a computer in communication with the output device 240). The illustrated wireless device also includes a connection or reconnection circuit 252 configured for fast connections to a target device and power savings. The connection circuit 250 may include a correlation circuit 250, a demodulator 260 and a comparison circuit 270, which are described in further detail below, for example, in reference to FIGS. 7-12. The connection circuit 250 may be sometimes referred to as a low latency reconnection circuit. The wireless device 200 may also include modulator 252, a transmitter 285, a receiver 280, and an antenna 290. A transceiver 183 of the wireless device 200 may combine transmitter 285 and receiver.

The processor 210 is configured to perform logical, computational, and control operations for the device. Memory unit 220 is configured to store data, including the sequence of bits that identify trigger sequences of bits associated with device 200. Output device 230 may be configured to output data or information to a user, including text on a laptop 130 screen, or audio from a cell phone 120 or an ear piece 110. Input device 230 may input data or information, including phone numbers typed by a user on a cell phone 120, mouse clicks in a mouse 140, or characters on a keyboard of a laptop 130.

In some implementations, for device 200 to send a data to another device 200, modulator 265 may be configured to modulate a data stream, such as a trigger bit sequence, from baseband onto a carrier frequency. Transmitter 285 is configured to transmit the modulated waveform over antenna 290 to the other device 200. After transmission to a listening device, for example, wireless device 200, the receiver 280 is configured to receive modulated waveforms on a carrier frequency over the antenna 290.

The correlation circuit 250 is configured to correlate modulated waveforms with circularly rotated versions of a trigger waveform associated with listening device 200. The demodulator 260 demodulates the modulated waveform from the carrier frequency to baseband, resulting in a received data stream or a received bit sequence. Comparison circuit 270 is configured to compare the received bit sequence with circularly rotated versions of a bit sequence associated with an address of the listening device 200.

Figure 11:
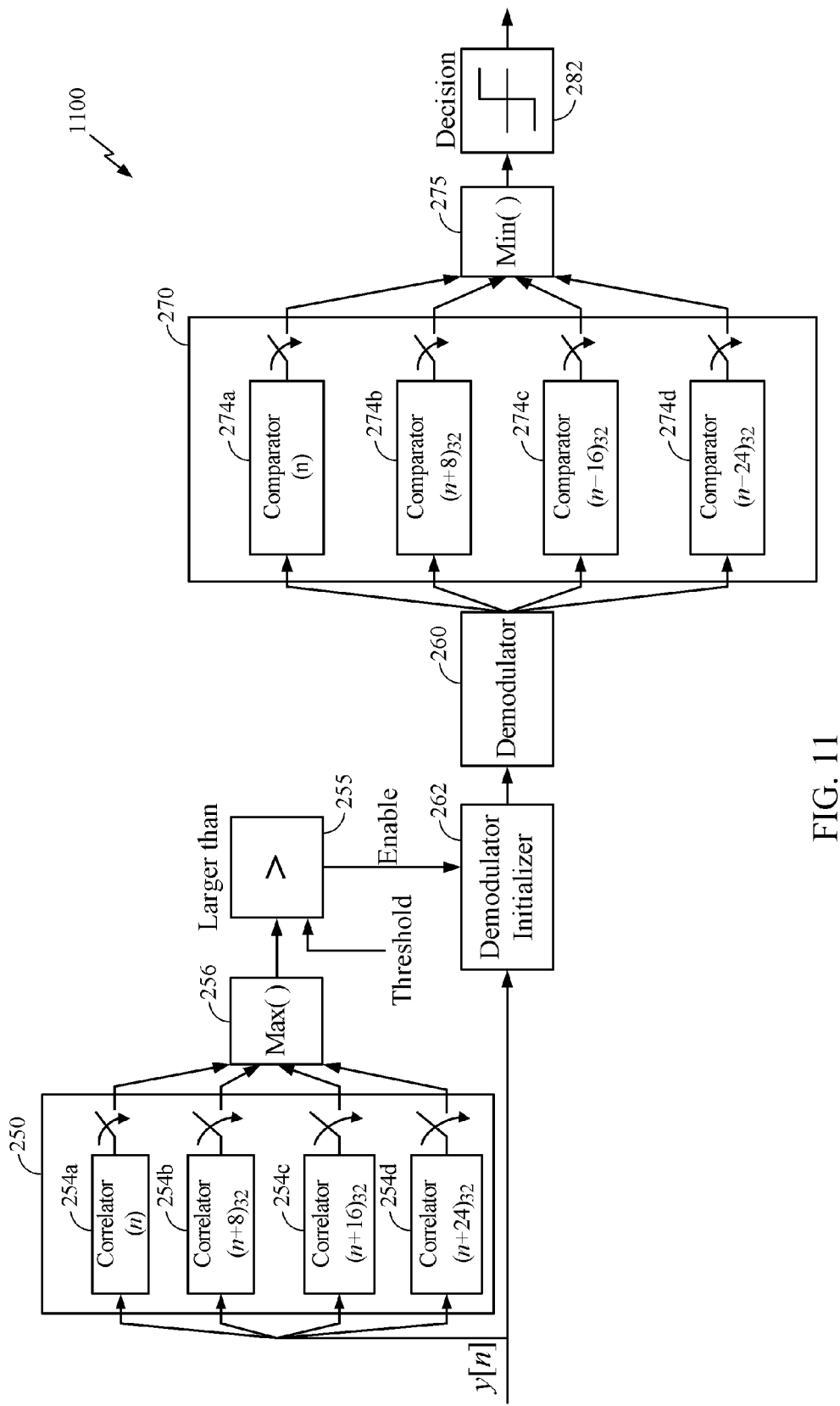
FIG. 11 is a schematic illustrating an example of an implementation configured for trigger detection that may increase the speed of correlating received waveforms with a target waveform using multiple correlators (for example, a bank of correlators) operating in parallel, and increase the speed of comparing demodulated sequences with target sequences of bits using multiple comparators (for example, a bank of comparators) operating in parallel.

The correlation circuit 250 may comprise a single correlator, which correlates different circularly rotated versions of a target waveform with a received waveform. A correlation circuit may comprise a bank of correlators 254a, 254b, 254c and 254d, as shown in FIG. 11 that correlate different circularly rotated versions of a target waveform with a received waveform in parallel. Correlation circuit 250 may use time sharing to correlate a received waveform with different versions of a target waveform in parallel. With time sharing, a single correlator correlates waveforms in parallel by time multiplexing.

Figure 9:
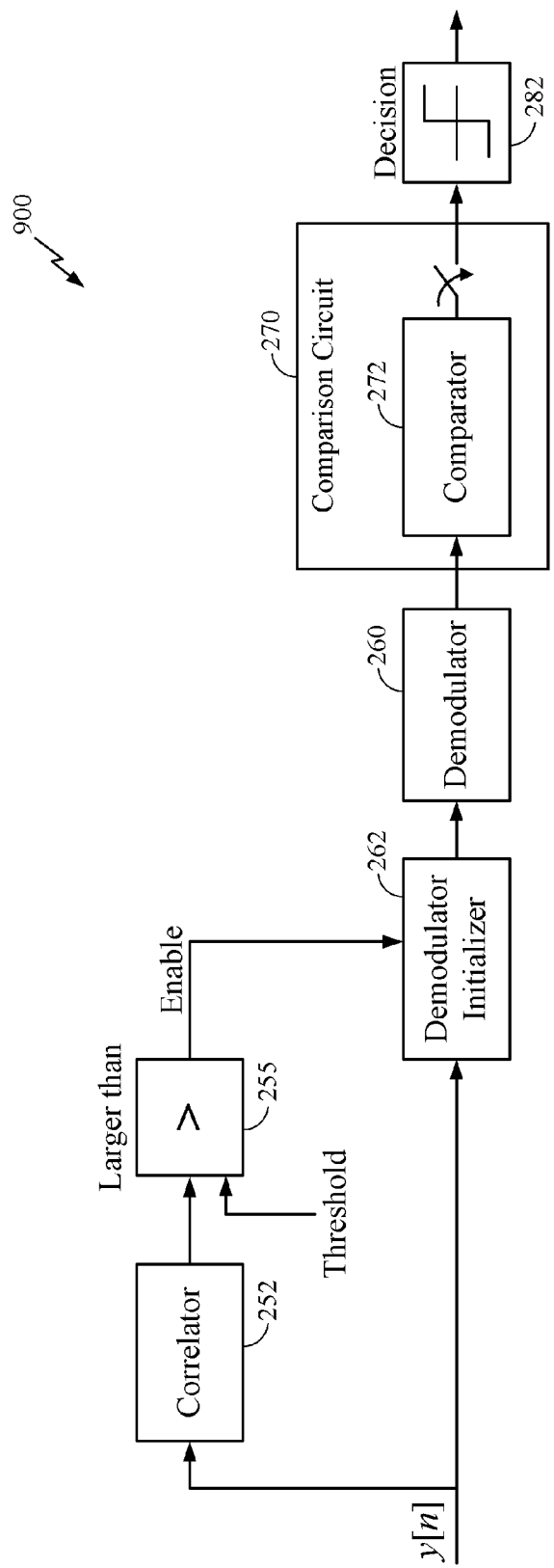
FIG. 9 is a schematic illustrating an example of an implementation configured for trigger detection that minimizes the probability of false alarms due to additive white Gaussian noise (AWGN) by correlation waveforms using a correlator, and minimizes the probability of false trigger detection by comparing demodulated bit sequences with target sequences of bits using a comparison circuit.

A comparison circuit 270 may comprise a single comparator 272, as shown in FIG. 9, which correlates different circularly rotated versions of a target bitstream address with a received sequence of demodulated bits. A comparison circuit 270 may include a plurality of comparators, for example a bank of comparators 274a, 274b, 274c, 274d, as shown in FIG. 11, that compare different circularly rotated versions of a target bitstream address with a received sequence of demodulated bits, in parallel. Comparator 272 may use a time sharing scheme to compare a received sequence of demodulated bits with different circularly rotated versions of a target bit-stream address in parallel. With a time sharing implementation, a single comparator 272 correlates waveforms in parallel by time sharing.

The cell phone 120, ear piece 110, laptop 130, and mouse 140 each are examples of wireless devices 200 that may connect or reconnect with other devices 200. For example, if the cell phone 120 and ear piece 110 are in range 105 of each other but lose their connection, the cell phone 120 may seek reconnection with the ear piece 110. For this example, the cell phone 120 is the initiator and the ear piece is the target.

Figure 3:
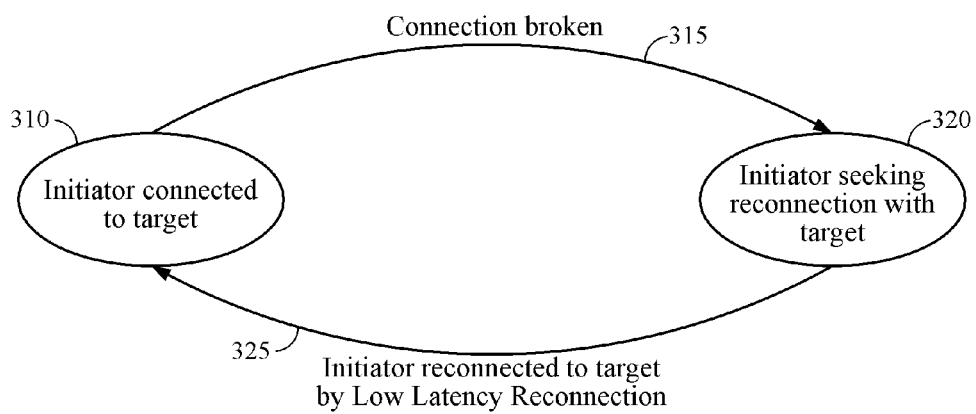
FIG. 3 is a state diagram depicting an example of states and state transitions for connecting and reconnecting an initiator device and a target device.

FIG. 3 is a state diagram depicting an example of states and state transitions for connecting and reconnecting an initiator device and a target device. Low latency reconnection is an exemplary implementation of trigger detection described in this disclosure using Bluetooth protocol to connect or reconnect wireless devices 200.

The initiator is connected to the target in state 310. When the connection is broke 315, the initiator and target are no longer connected and the devices transition to a state where the initiator is seeking reconnection with the target 320. The initiator reconnects to the target using low latency reconnection 325, resulting in a return to the initial state 310 in which the initiator is connected to the target.

Figure 4:
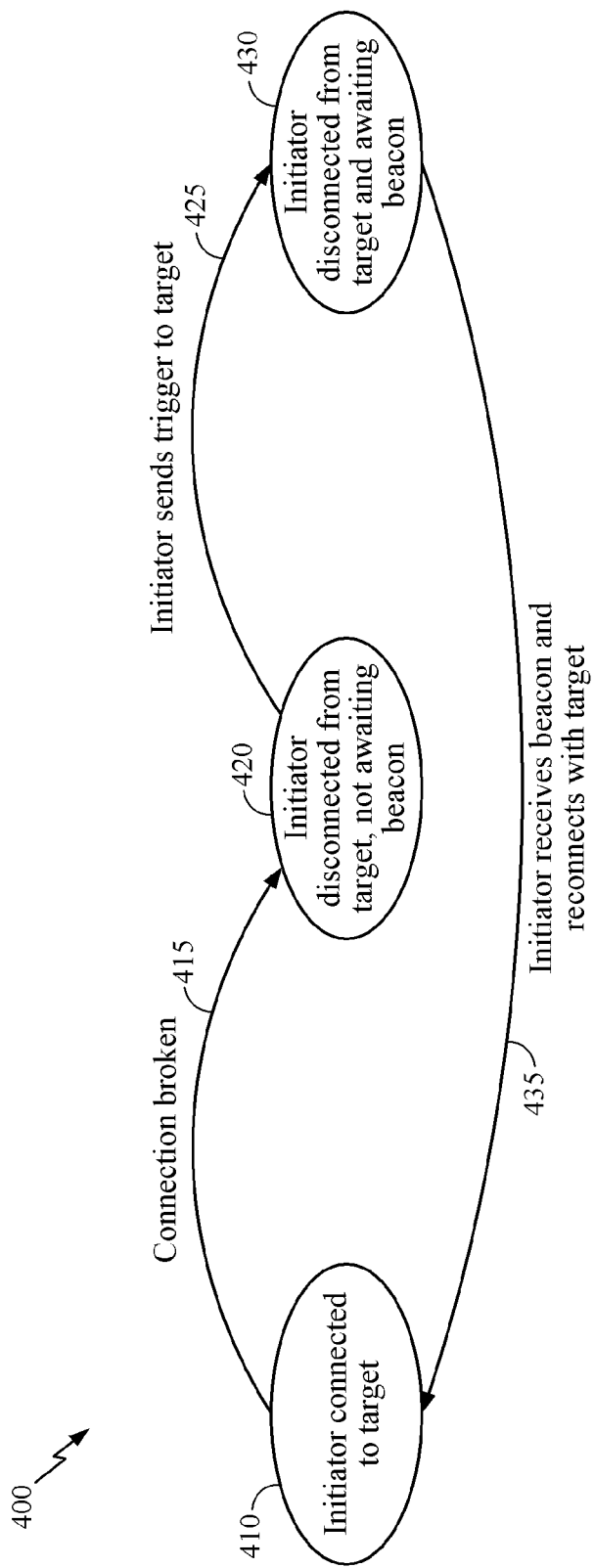
FIG. 4 is a state diagram depicting an example of states and state transitions for an initiating device (initiator) as it reestablishes connection with a target device (target).

FIG. 4 is a state diagram depicting an example of states and state transitions for an initiating device ("initiator") as it reestablishes connection with a target device ("target"). The initiator is connected to the target in state 410, until the connection is broken 415. The initiator is in state 420, in which the initiator is disconnected from the target. The initiator sends a trigger waveform in state transition 425 and enters state 430, in which the initiator is disconnected from the target and awaiting a beacon in response to the trigger waveform. The initiator transitions to connected state 410 after the initiator receives a beacon and reconnects with the target.

Figure 5:
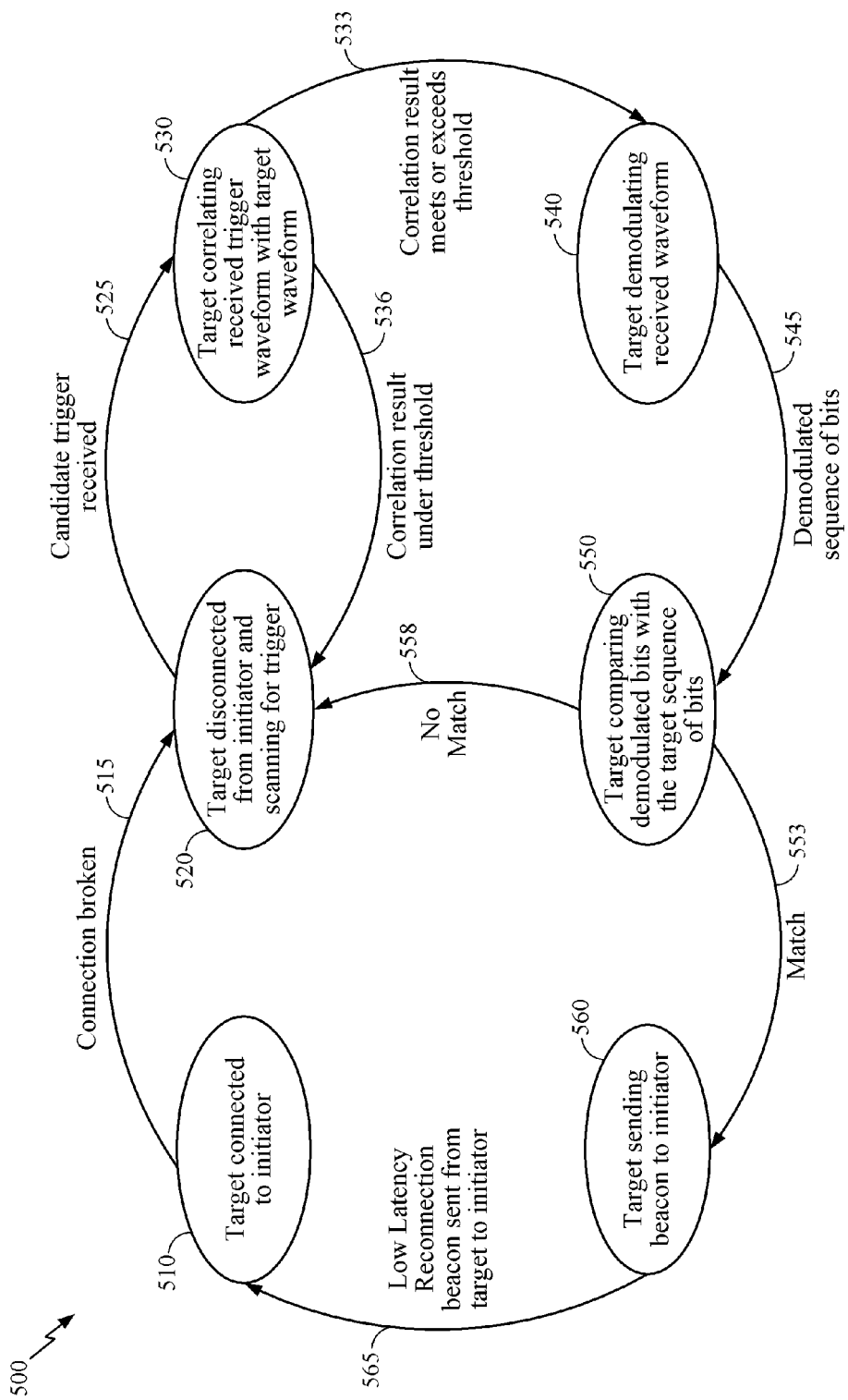
FIG. 5 is a state diagram depicting an implementation of states and state transitions for an exemplary target device as it scans for a trigger waveform, detects the trigger, demodulates it, determines whether there is an address match, and sends a beacon to the initiator when there is a match.

FIG. 5 is a state diagram depicting an example implementation of states and state transitions for a target device as it scans for a trigger waveform, detects the trigger, demodulates it, determines whether there is an address match, and sends a beacon to the initiator when there is a match. The target in state 510 is connected to the initiator. When the connection is broken in state transition 515, the target enters state 520 in which it is disconnected from the initiator and scanning for a trigger. When the target receives a candidate trigger in state transition 525, the target enters state 530 in which the target correlates the received trigger waveform with the target waveform. From state 530 there are two state transitions depicted in FIG. 3. The target returns to state 520 when the correlation result is less than a threshold in state transition 536, signifying that the received waveform is not correlated with a target waveform and the target continues to scan for a trigger.

When the correlation result is a certain value, for example, in some implementations a value that either meets the threshold, or in other implementations a value that exceeds the threshold in state transition 533, the target enters state 540 in which the target demodulates the received waveform. When in state 530, the target demodulator 260 outputs a demodulated sequence of bits, which corresponds to state transition 545. The target transitions to state 550, in which the target compares demodulated bits with the target sequence of bits.

FIG. 5 depicts two transitions from state 550. The target returns to scanning state 520 with state transition 558 when the comparison result is no match. The target transitions to state 560, with state transition 553 when the comparison result is a match. In state 560, the target sends a beacon to the indicator, in state transition 565, resulting in transition to connection state 510.

Figure 6:
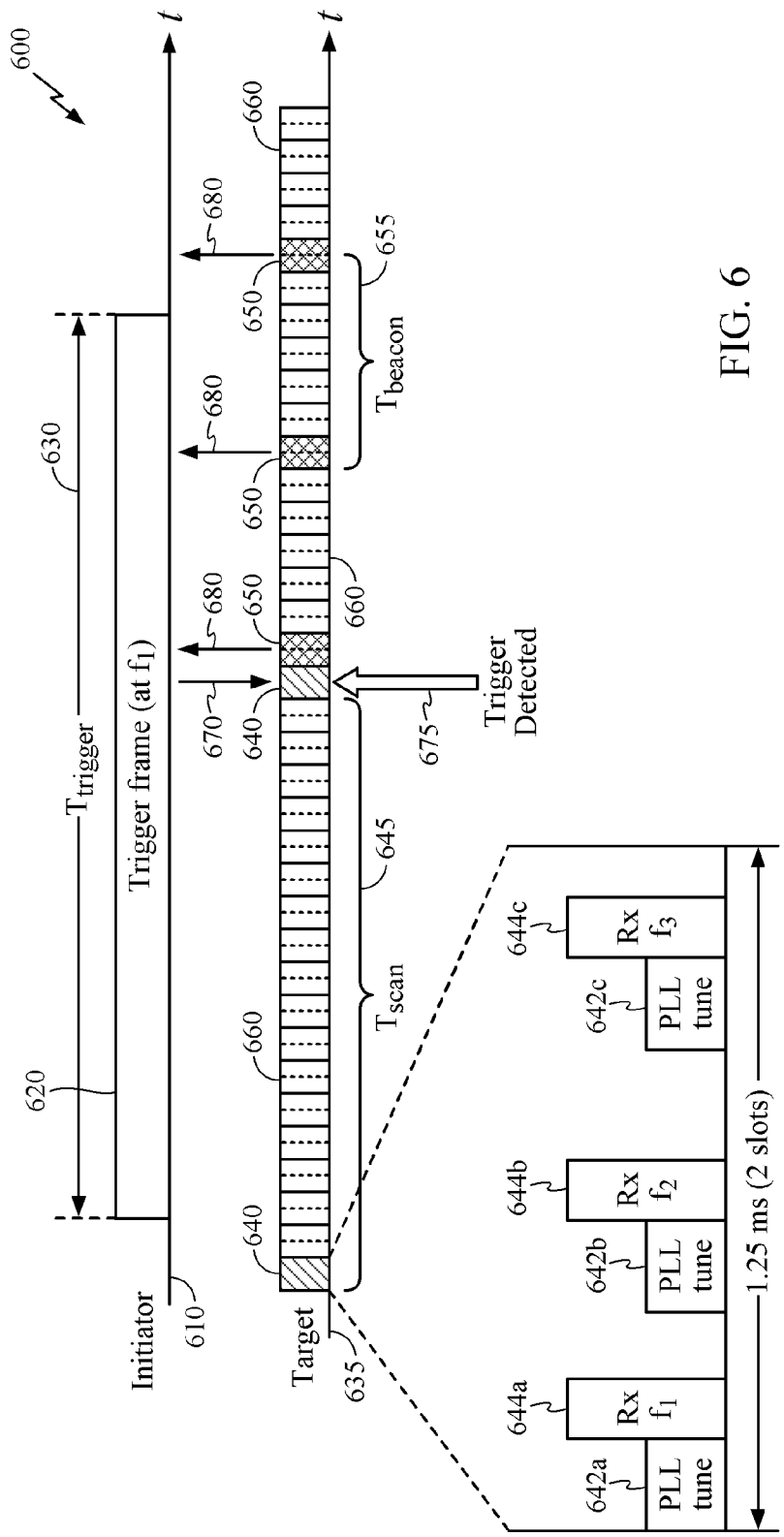
FIG. 6 is a schematic illustrating an example of certain relationships of a low latency reconnection scheme between an initiator device and a target device.

FIG. 6 is an exemplary schematic depicting low latency reconnection between an initiator and a target. Low latency reconnection may be used by Bluetooth devices for connection or to reestablish connection between previously paired Bluetooth devices. Low latency reconnection has lower latency and requires less power for reconnection than other techniques including Sniff Mode and Park Mode. The approach 600 described in FIG. 6 applies to both reconnection and connection between an initiator and a target. FIG. 6 depicts the initiator timeline 610 and target timeline 635. The initiator transmits a trigger frame 620 at a given frequency f1 to the target device. In some implementations, a trigger frame is a 32 bit sequence repeated back to back for a total duration of $T_{trigger}$ 630. In some implementations, the trigger data modulated using GFSK. In this example, the trigger frame 520 may be transmitted on one of three specific channel frequencies f1, f2, or f3. The target device does not know which frequency is being used by the initiator so it needs to scan the three possible frequencies using phase locked loop and receiver pairs (642a, 644a), (642b, 644b), and (642c, 644c) to scan for channel frequencies f1, f2, and f3, respectively.

In the example in FIG. 3, the target scans for the trigger waveform on the three channel frequencies during two 1.25 ms time slots 640. After scanning for two slots, the target conserves power for thirty-four time slot 660, at which time it reached the $T_{scan}$ 645 period and scans for the trigger waveform on the three channel frequencies during two 1.25 ms time slots 640. $T_{scan}$ 645 may vary in different implementations. In some implementations, $T_{scan}$ 645 is shorter than $T_{trigger}$ 630 to ensure scanning during a trigger frame 620 from the initiator.

The initiator repeatedly transmits the trigger during the Trigger frame 620. Once the target detects the 32-bit trigger sequences 670 sent during corresponding scanning time slots 640 results in trigger detection 675 by the target. The target responds to the initiator with beacon 680 during time slots 650 at period $T_{beacon}$ 655. The beacons 680 are transmitted on the same frequency as the trigger frame. Once the initiator receives the beacon, a set of messages are transmitted between the two devices to re-establish the connection (not shown).

Figure 7:
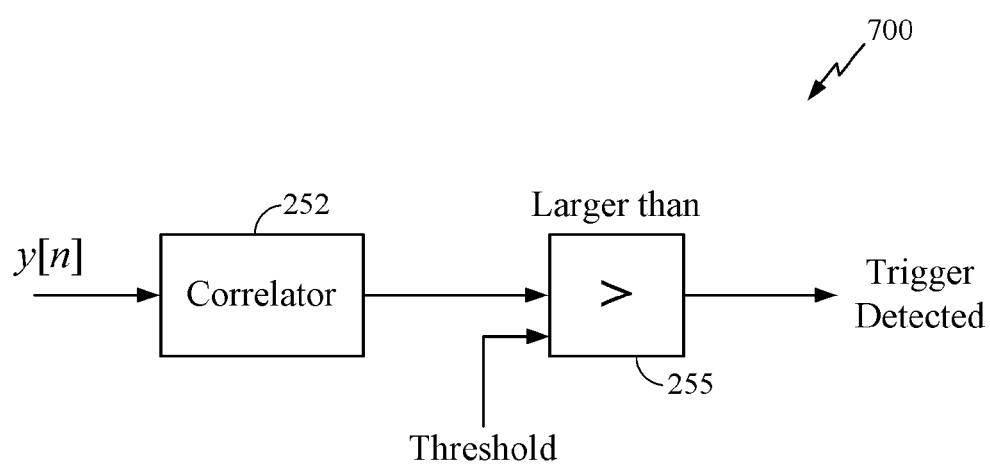
FIG. 7 is a schematic illustrating an example of an implementation configured for low latency reconnection (LLR) trigger detection.

FIG. 7 is a schematic illustrating an example of an implementation configured for low latency reconnection (LLR) trigger detection. In this implementation, correlator 252 is matched to the trigger waveform of the target device. The correlator 252 is typically implemented on the in-phase (I) and quadrature domain (Q). The correlator 252 correlates the received trigger waveform with the desired trigger waveform. The LLR trigger is detected 255 when the output of the correlator is higher than a given threshold (programmable). The major advantage of using a correlator is that the probability of false alarm due to AWGN noise (i.e., the receiver processes a received signal and determines that a LLR trigger is present but there is only AWGN noise at the antenna input) is greatly reduced.

In general, we can write the sampled trigger GFSK signal x[n]

$$x[n] = \sqrt{P} e^{j\phi[n]} \quad (1)$$

where P is the signal power and $$\phi[n] = 2\pi \sum_{k=n-L+1}^{n} b[k]q(nT - kT) + \pi \sum_{k=0}^{n-L} b[k] \quad (2)$$

where b[n] is the $n^{th}$ transmitted bit, T is the symbol period, q(t) is the integrated net pulse shape function and L is the length of q(t) (in samples). In Eq. (1), we assume that the signal x[n] is sampled at 1 sample per symbol, i.e., $f_s=1/T$. The received signal can be written as $$y[n] = x[n] + w[n] \quad (3)$$

where x[n] is given by Eq. (1) and w[n] is complex circular AWGN noise with total variance $\sigma^2$.

Four metrics characterize trigger sequence detection performance. The probability of detected trigger, $P_{det}$, is the probability of correctly detecting a trigger transmitted by the initiator to the target and addressed to the target. The probability of missed trigger, $P_{miss}$ is the probability of not correctly detecting a trigger transmitted by the initiator to the target and addressed to the target. The probability of false trigger $P_{false}$, is the probability of incorrectly identifying a trigger sent to a different target as intended for this target. The probability of false alarm, $P_{alarm}$, is the probability of incorrectly concluding that a trigger was sent to the target when not trigger was sent by the initiator, for example, in the presence of additive white Gaussian noise (AWGN) only.

The approach of FIG. 7 reduces the probability of a false alarm $P_{alarm}$ due to AWGN, but it may not be optimized to distinguish between nearly identical trigger words, resulting in higher $P_{false}$ when the Hamming distance between device addresses is low. Moreover, the approach of FIG. 7 is not optimized to obtain both a low probability of missed detection $P_{miss}$ and a low probability of false alarms $P_{alarm}$. Alternative embodiments below address these issues.

Figure 8:
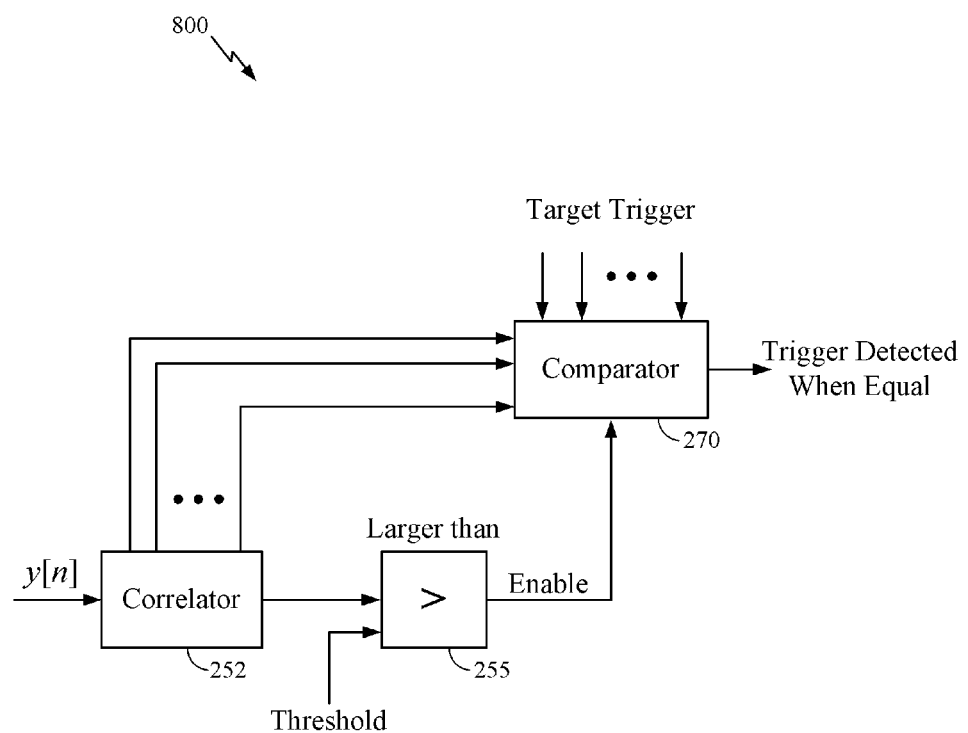
FIG. 8 is a schematic illustrating an example of an implementation configured for trigger detection that includes both correlation and packet checking.

FIG. 8 is a schematic illustrating an example of an implementation configured for trigger detection that includes both correlation and packet checking. FIG. 8 is an exemplary schematic for trigger detection. The trigger detection includes both correlation and packet checking to reduce $P_{false}$. In order to minimize the high probability of false detection, in one implementation 800 a Bluetooth modem implemented a "packet check" subsystem with a comparator 270 in addition to the regular correlator 250. Once the correlator output is greater than a threshold 255, the comparator 270 compares the received 32 symbols that are in the memory of the correlator with the 32 symbols from the expected LLR trigger word. If all 32 symbols match, then the target device declares that a LLR trigger was found. This approach reduces $P_{false}$, even for cases where there the Hamming distance between two sequences is low.

Figure 13:
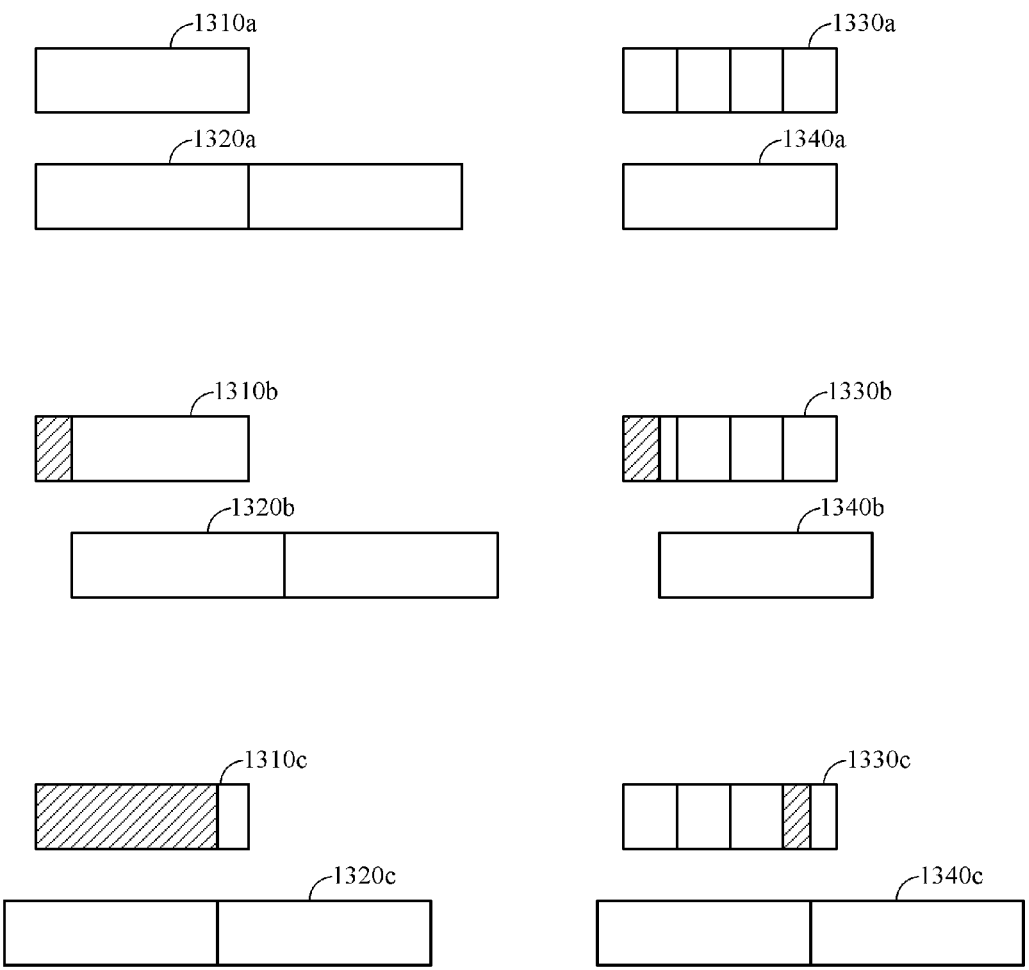
FIG. 13 is a graphical illustration of the speed advantage provided by parallel operation for correlation operation and comparison operations due to boundary misalignment between the received waveform and target waveform, or between the demodulated sequence of bits and the target sequence of bits.

The approach of FIG. 8 is not optimized to reduce $P_{alarm}$ and $P_{miss}$. Moreover, the approach of FIG. 8 does not address trigger detection errors due to misalignment between the received waveform and the target waveform. FIG. 13 is a graphical illustration of the speed advantage provided by parallel operation for correlation operation and comparison operations due to boundary misalignment between the received waveform and target waveform, or between the demodulated sequence of bits and the target sequence of bits. Specifically, FIG. 13 depicts examples of three alignment cases. Target bit sequence 1310a and received bit sequence 1320a, showing two trigger sequences, are aligned. Target bit sequence 1310b and received bit sequence 1320b are not aligned, because the start of received bit sequence 1320b occurs after the start of target bit sequence 1310b. Target bit sequence 1310c and received bit sequence 1320c are not aligned, because the start of received waveform 1320c precedes the start of target bit sequence. If the received 32 bit LLR trigger word is not aligned with the correlator, there is a significant probability of the trigger detection to fail since the received LLR trigger boundary is not aligned with the correlator. Misalignments result in mismatches between the received waveform and the target waveform, resulting in lower correlations and an increased $P_{miss}$.

Below is an implementation of a proposed trigger detection architecture optimized for $P_{det}$, $P_{miss}$, $P_{false}$, and $P_{alarm}$. It also enables use of diversity by correlating, demodulating, and comparing more observations of the trigger word within the trigger frame to further reduce the probability of missed detection $P_{miss}$.

In general, we can write the sampled GFSK signal x[n] as $$x[n] = [n]\sqrt{P} e^{j\phi[n]} \quad (4)$$

where P is the signal power and $$\phi[n] = 2\pi \sum_{k=n-L+1}^{n} b[k]q(nT - kT) + \pi \sum_{k=0}^{n-L} b[k] \quad (5)$$

where b[n] is the $n^{th}$ transmitted bit, T is the symbol period, q(t) is the integrated net pulse shape function and L is the length of q(t) (in samples). For the remainder of the document, we assume L=3. In Eq. (4), we assume that the signal x[n] is sampled at 1 sample per symbol, i.e., $f_s=1/T$. The received signal can be written as $$y[n]=x[n]+w[n] \quad (6)$$

where x[n] is given by Eq. (4) and w[n] is complex circular AWGN noise with total variance $\sigma^2$. We assume for now that there are is no frequency and no timing offset. We can write the maximum likelihood (ML) estimator for the 32 bit trigger sequence as $$\hat{x}_{ML} = \arg\max_{\vec{x}} p(\vec{y}|\vec{x}) \quad (7)$$

$$= \arg\max_{\vec{x}} \sum_{l=1}^{N=32} \log(p(y[l]|x[l]))$$

where $\vec{y}$ is a vector with N=32 observations of the received signal, i.e., $\vec{y}=(y[1], \ldots, y[32])^T$ and $p(\vec{y}|\vec{x})$ is the conditional probability density function (pdf) of the 32 samples of the received waveform given that transmitted waveform is $\vec{x}$. We assume for now that the only two possible received sequences are either the desired trigger sequence or just noise, i.e., $\vec{x}\{x_{trigger}[n] \text{ or } [0,0,\ldots,0]\}$. In this case, we can expand the ML estimate from Eq. (7) as $$\sum_{l=1}^{N=32} \frac{\|y[l] - x_{trig}[l]\|^2}{2\sigma^2} < \sum_{l=1}^{N=32} \frac{\|y[l]\|^2}{2\sigma^2} \quad (8)$$

$$2\sum_{l=1}^{N} \Re\{y[l]x_{trig}^*[l]\} > N \cdot P$$

In other words, Eq. (8) tells us that the optimum detection is using a correlator matched to the desired waveform samples when only AWGN is present. Furthermore, we can also conclude from Eq. (8) that using a correlator matched to the trigger waveform minimizes the probability of false alarm, $P_{alarm}$ due to AWGN noise only.

We now consider the scenario when undesired (or mismatched) trigger sequences are also present at the receiver. We assume that, in the worst case, the minimum Hamming distance between different trigger sequences is $d_{min}=1$.

The ML estimate from Eq. (7) in the presence of undesired trigger sequences is $$\sum_{l=1}^{N=32} \frac{\|y[l] - x_{trig}[l]\|^2}{2\sigma^2} < \sum_{l=1}^{N=32} \frac{\|y[l] - x_{undes}[l]\|^2}{2\sigma^2} \quad (9)$$

It is difficult to further expand Eq. (9) since the samples of any 32 bit trigger sequence are correlated by the GFSK modulation. If the samples of the trigger sequences were independent, the decision rule for $d_{min}=1$ would be $$\|y[l]-x_{trig}[l]\|^2 < \|y[l]-x_{undes}[l]\|^2 \text{ for } l=1,2,\ldots,N=32 \quad (10)$$

In other words, if the samples of the trigger sequence were independent, the receiver would demodulate each bit independently and check if all the 32 demodulated bits match with the bits from the expected trigger sequence. This method would then minimize the probability of a false trigger. However, in embodiments where the samples of the trigger sequence waveform are correlated (because of GFSK modulation) the bits are not demodulated independently. Hence, the optimum method would be to use maximum-likelihood sequence detection (MLSD) to demodulate the full 32 bits and then check if all the demodulated bits match with the expected trigger. This technique is only optimal for Implementing an MLSD receiver is costly compared to other demodulation approaches, so some embodiments use a decision feedback demodulator (DFD) to demodulate the trigger sequence. The DFD achieves a sensitivity close to that of MLSD, so embodiments that use a DFD may perform well. The target device may use MLSD, DFD, or other demodulation schemes to demodulate received trigger waveforms.

FIG. 9 is a schematic illustrating an example of an implementation configured for trigger detection that minimizes the probability of false alarms due to additive white Gaussian noise by correlation waveforms using a correlator 252, and minimizes the probability of false trigger detection by comparing demodulated bit sequences with target sequences of bits using comparison circuit 270. Correlator 252 is configured to correlate the received waveform with circularly rotated or shifted versions of a target waveform to first check if a "potential" 32 bit LLR trigger sequence is present. In the implementation illustrated in FIG. 9, the signal y[n] is given by Eq. (6) and the correlator is matched to the 32 bit LLR trigger waveform, i.e., x[n]. As shown above, a correlator minimizes the probability of false alarm when only AWGN is presented at the antenna input.

If the correlator in FIG. 9 finds a "potential" LLR trigger word when threshold unit 255 determines that result of the correlation is larger than a threshold, the threshold unit 255 invokes demodulator initializer 262, which initializes demodulator 260, and the time and frequency tracking loops (not shown). The target device may use any demodulator in this architecture. Upon initialization, the demodulator 260 demodulates the bits of the trigger frame. The target then uses comparator 272, with a 32 bit sliding window, on the demodulated bits in order to determine if any consecutive set of 32 demodulated bits match the target sequence of 32 bits from the desired LLR trigger sequence. If all 32 bits match, the decision unit 282 indicates that a trigger was found. This minimizes the probability of false detection by demodulating and confirming all the 32 bits. This example describes a case where all 32 bits need to match. The decision unit 282 may apply other Hamming distances; for example, a single bit error may be deemed acceptable if the Hamming distances between devices are designed to be at least two.

The comparator 272 may slide over several consecutive sets of 32 bits inside the trigger frame until there is a match. This allows the target to take advantage of the 32 bit periodic nature of the trigger frame in order to obtain a diversity gain for LLR trigger detection when the signal to noise ratio (SNR) is low. Moreover, the sliding window comparator solves both the boundary misalignment and the early start issues of the correlator as described in FIG. 13. As noted above, target bit sequence 1310b and received bit sequence 1320b are not aligned, because the start of received bit sequence 1320b occurs after the start of target bit sequence 1310b. By circularly rotating the target bit sequence 1310b by an interval corresponding to the width of the shaded region in 1310b, the boundaries of the target bit sequence 1310b and the received bit sequence 1320b align. Target bit sequence 1310c and received bit sequence 1320c are not aligned, because the start of received bit sequence 1320c precedes the start of target bit sequence 1310c. By circularly rotating the target bit sequence 1310c by an interval corresponding to the width of the shaded region in 1310c, the boundaries of the target bit sequence 1310c and the received bit sequence 1320c align. By circularly rotating or shifting the target bit sequences, the comparator 272 compares aligned sequences of bits to determine if the received demodulated bit sequence matches the target bit sequence address.

The addition of the comparison circuit 270 with a comparator may be implemented with little increase in hardware complexity; for example with the addition of 32 XOR gates.

An embodiment in which a target device that uses the FIG. 9 Bluetooth LLR trigger detection scheme requires a receive window time of $$t_{req} = N + (N-1) + (N-1) + N$$
$$= 4N - 2$$
$$= 126 \ \mu s \qquad (11)$$

where N=32 is the length of the LLR trigger word. We note that one LLR bit has a duration of 1 μs. The worst case scenario described in Eq. (11) corresponds to the scenario where both the correlator and the sliding window are misaligned by N−1=31 bits In some implementations, the target searches for a trigger waveform at one carrier frequency during a period of 312.5 μs, or half a Bluetooth time slot 640. Typically, phase lock loop tuning 642 takes approximately ~75 μs, so the total available receiver window is approximately 235 μs. However, the target requires time to cancel the DC offset and to initialize the modem before it can start searching for the LLR trigger. Assuming a total modem overhead time of 35 μs, the target has a total time of 200 μs to detect the LLR trigger (including SW and protocol delays). The time required for the modem to detect a LLR trigger in the worst case scenario is 126 μs (see Eq. (11). Hence, one can conclude that there is not that much time margin. Furthermore, if the target wants to use diversity in the LLR detection, it needs to wait 32 us more until a new set of 32 bits are received.

Figure 10:
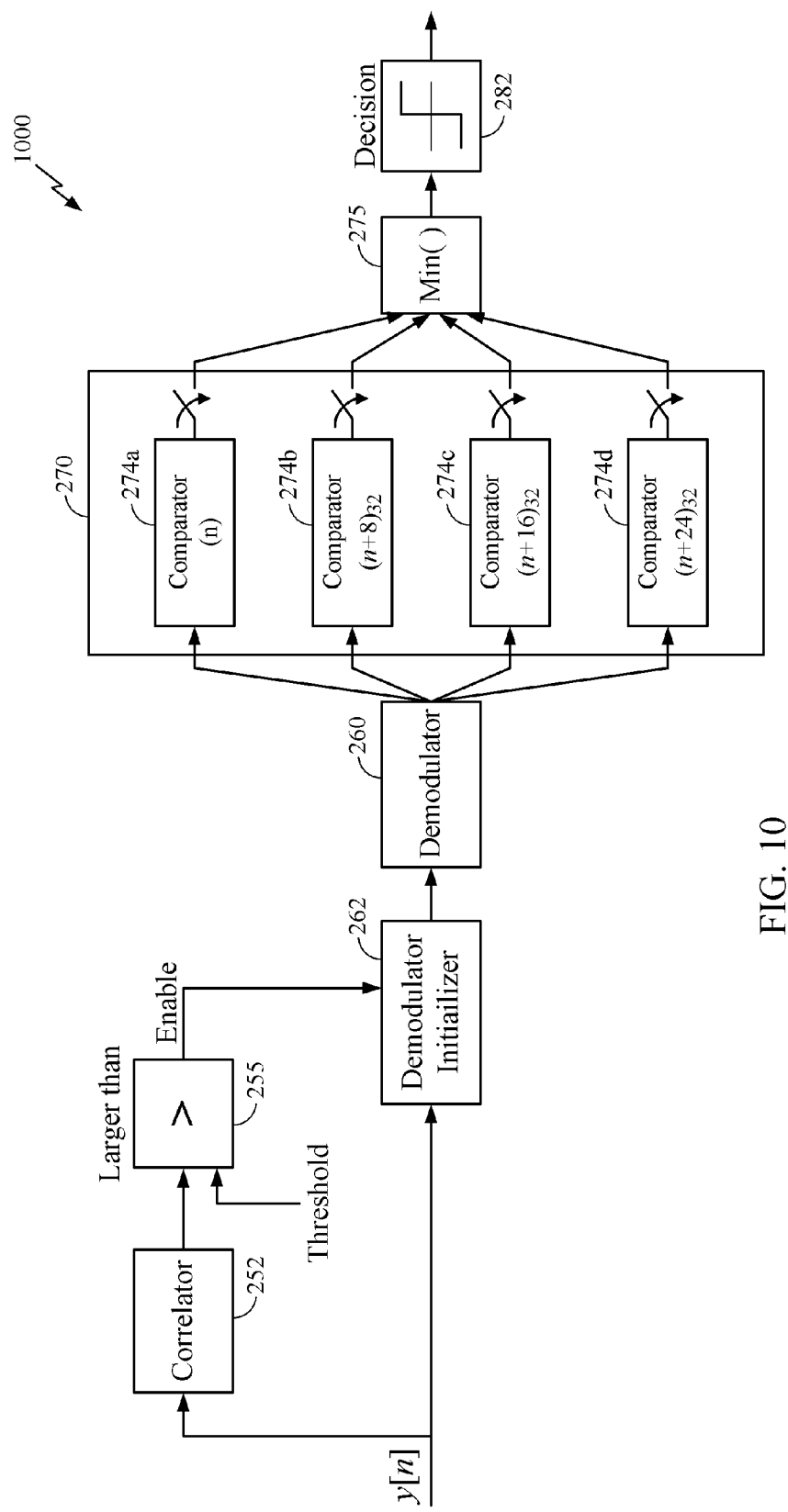
FIG. 10 is a schematic illustrating an example of an implementation configured for trigger detection that may increase the speed of comparing demodulated sequences with target sequences of bits using multiple comparators (for example, a bank of comparators) for comparing circularly rotated versions of the desired 32 bit trigger word by an integer multiple of 8 to speed comparison with parallel operation.

FIG. 10 is a schematic illustrating an example of an implementation configured for trigger detection that may increase the speed of comparing demodulated sequences with target sequences of bits using multiple comparators (for example, a bank of comparators). The approach of FIG. 10 incorporates a bank of comparators 274a-d that compare circularly rotated versions of the desired 32 bit trigger word by an integer multiple of 8 to speed comparisons with parallel operation. The four comparators, or sliding windows, run in parallel to confirm the LLR trigger. The reference trigger for each sliding window is a circularly rotated version of the desired 32 bit trigger word by an integer multiple of 8 (i.e., N/4).

Moreover, parallel sliding window comparators speed alignment, as depicted in FIG. 13. Target bit sequences 1330a, 1330b, and 1330c depict the care with four comparators corresponding to 1310a, 1310b, and 1310c, respectively. Each of the four boxes in 1330 corresponds to the circularly rotated versions of the target bit sequence compared by each of the four comparators 274a-d. Target bit sequence 1330a and received bit sequence 1340a, showing two trigger sequences, are aligned. Target bit sequence 1330b and received bit sequence 1340b are not aligned, because the start of received bit sequence 1320b occurs after the start of target bit sequence 1310b. Comparator 274a circularly rotates the target bit sequence 1340b by an interval corresponding to the width of the shaded region in 1330b, so that the boundaries of the target bit sequence 1330b and the received bit sequence 1340b align. Target bit sequence 1330c and received bit sequence 1340c are not aligned, because the start of received waveform 1340c precedes the start of target bit sequence 1330c. Comparator 274d (the fourth box) circularly rotates the target bit sequence by 24 bits plus the number of bits corresponding to the width the shaded region in the fourth box so that the boundaries of the target bit sequence 1330c and the received bit sequence 1340c align. Because of parallel processing the time delay corresponds to the shorter width of the shaded region in 1330c, as opposed to the wider shaded region in 1310c. If the misalignment corresponds to 28 bits, for 1310c without parallel processing, comparator 272 shifts and compares the target sequence 27 times to reach a beginning point at bit 28. With parallel processing, comparator 174d shifts and compares the target sequence 3 times to reach a beginning point at bit 28.

An embodiment in which a target device that uses the FIG. 10 Bluetooth LLR trigger detection scheme requires a receive window time of $$t_{req} = N + (N-1) + \left(\frac{N}{4} - 1\right) + N \qquad (12)$$
$$= \frac{13N}{4} - 2$$
$$= 102 \ \mu s$$

where N=32 is the length of the LLR trigger word, a reduction from 126 μs. The other advantage of the approach depicted in FIG. 10 is that the target only needs to receive an extra 8 bits in order to starting getting some diversity gain while the architecture in FIG. 9 requires at least a new set of 32 bits.

Increasing the number of sliding window comparators 274a-d to four only requires a small increase in the hardware complexity by taking advantage of time sharing. For example, the demodulator 260 for the majority of the BT chips runs at 1 MHz while the overall modem typically runs at a faster rate (e.g., 32 MHz). In some implementations, the hardware has only one physical sliding window and the 4 parallel sliding window comparators 274a-d functionality is implemented by time-sharing at a faster rate (e.g. 4 MHz) the same sliding window hardware.

Figure 12:
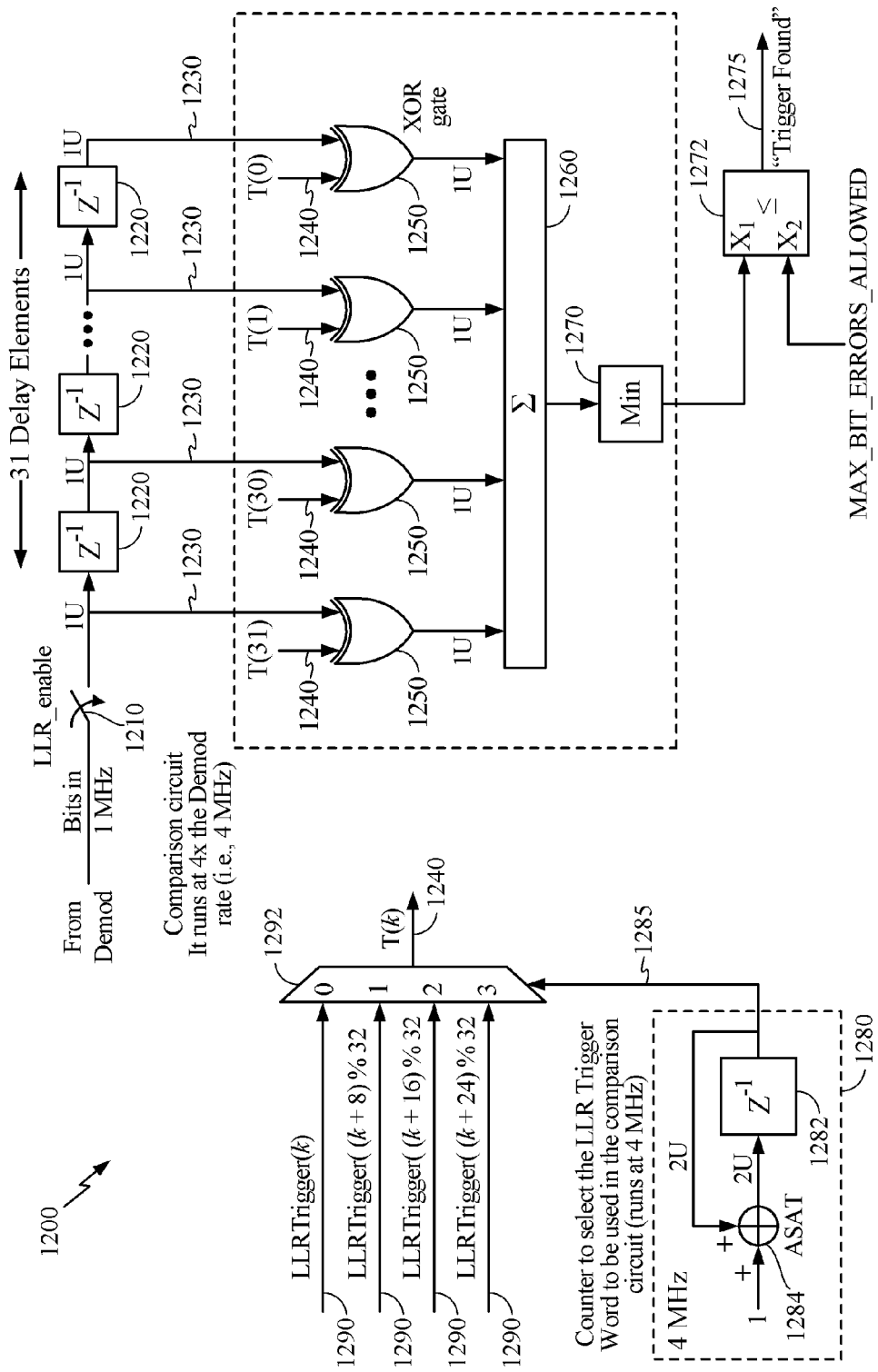
FIG. 12 depicts a schematic illustrating an example of an implementation for a comparison circuit that is configured to use time sharing to implement parallel comparisons on a single comparator.

FIG. 12 depicts a schematic illustrating an example of an implementation for a comparison circuit 1200 that is configured to use time sharing to implement parallel comparisons on a single comparator. Switch 1210 closes when LLR is enabled, allowing a sequence of demodulated bits from the demodulator 260 to enter 31 delay elements 1220, and feed into XOR gates 1250, where they are XORed with a set of target trigger bits 1240. A summer 1260 sums the results of the XOR comparisons, and feeds the sum to a minimum unit 1270. Less than or equal to circuit 1272 compares the output of minimum unit 1270 with a maximum number of bit errors allowed, and outputs "trigger found" 1275 when there is a match. The triggers T(k) 1240 are delivered by multiplexer 1292 based on the LLR Trigger sequence 1290 for the circularly rotated target bit stream corresponding to each of the four comparators, as well as a counter 1280 that outputs signal 1285 to select the LLR trigger word to be used in the comparison circuit that runs at 4 MHz. Counter 1280 includes asymmetrical saturation (ASAT) unit 1284 and delay 1282.

The trigger detection scheme of FIG. 10 significantly reduces the probability of false trigger detection, and enables simultaneous reduction in the probability of missed detects and the probability of false trigger detection. The probability of false alarms due to AWGN is optimized, as it is for a standard correlator. Boundary misalignment is mitigated since the sliding window realigns the trigger bit pattern, which also lowers the probability of a missed trigger. Since the probability of false trigger detection is low, the target device can use more observations of the trigger frame, i.e., diversity, to further reduce the probability of missing a trigger. This is particularly useful when the SNR is low. In this case, the target device is trading-off between probability of missed detection and false detection. This trade-off on the previous architectures was not practical since the probability of false detection would drastically increase with the number of observations.

The new trigger detection architecture uses 4 sliding windows in parallel so the target only needs to receive an extra 8 bits in order to start having some diversity gain. This is advantageous since the target device doesn't need to wait for a full trigger word (i.e., 32 bits) in order to perform a new observation.

FIG. 11 is a schematic illustrating an example of an implementation configured for trigger detection that may increase the speed of correlating received waveforms with a target waveform using multiple correlators (for example, a bank of correlators 254a-d) operating in parallel, and increase the speed of comparing demodulated sequences with target sequences of bits using multiple comparators (for example, a bank of comparators 274a-d) operating in parallel. The bank of correlators 254a-d in the Correlation Circuit 250 performs a fast, initial LLR trigger check during acquisition of a received waveform. The SyncWord for each correlator 254a-d is a circularly rotated version of the reference 32 bit trigger waveform by an integer multiple of 8 (i.e., N/4), similarly as done for the 4 sliding window banks. The reference word for each sliding window correlator is a circularly rotated version of the target 32 bit trigger word by an integer multiple of 8. This detection technique further reduces the required received window time to detect a LLR trigger.

An embodiment in which a target device that uses the FIG. 11 Bluetooth LLR trigger detection scheme requires, in the worst case, a receive window time of $$t_{req} = N + \frac{N}{4} - 1 + N + \frac{N}{4} - 1 \quad (13)$$
$$= \frac{5N}{2} - 2$$
$$= 78 \ \mu s$$

where N=32. The scheme in FIG. 11 also has all the advantages of the architecture in FIG. 10. With time sharing, it also does not require much more hardware complexity to implement the four correlators in parallel.

Figure 14:
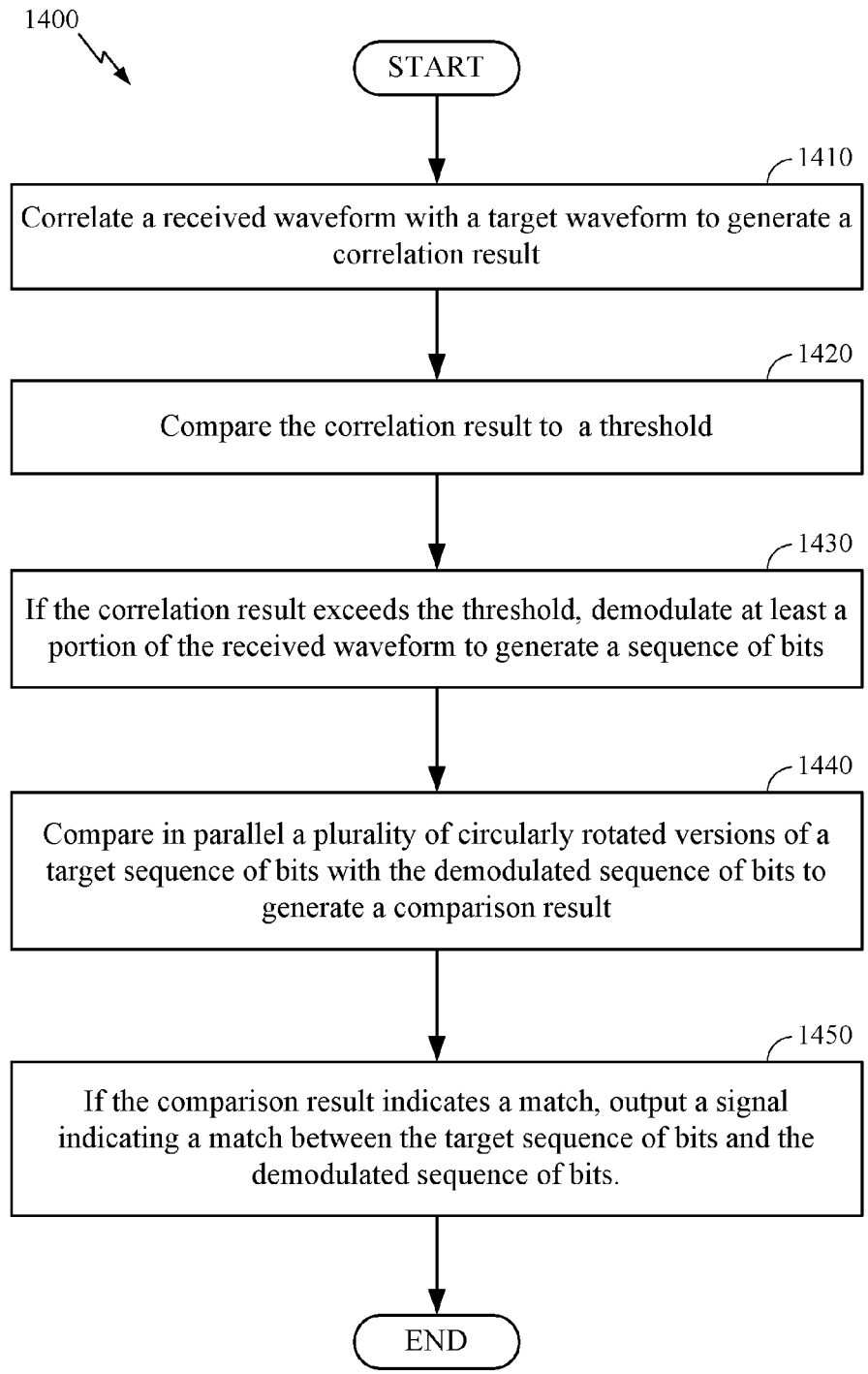
FIG. 14 is a flowchart that illustrates an example of a process by a target device to detect a trigger.

FIG. 14 is a flowchart that illustrates an example of a process 1400 by a target device to detect a trigger. At block 1410, the process 1400 correlates a received waveform with a target waveform to generate a correlation result. In some implementations, the functionality of block 1410 may be performed by the correlation circuit 250 (FIG. 2), and in other implementations by the processor 210 illustrated in FIG. 2 (for example, in implementations that may not have a separate correlation component). At block 1420, the process 1400 compares the correlation result to a threshold (or a threshold value). In some implementations, the functionality of block 1420 may be performed by the correlation circuit 250, and in other implementations the functionality of block 1420 may be performed by the processor 210. At block 1430, if the correlation result exceeds or crosses the threshold (or otherwise meets a certain criteria with respect to the threshold, for example, being at the threshold depending on the way the threshold is defined), the process 1400 demodulates at least a portion of the received waveform to generate a sequence of bits. In some implementations, the functionality of block 1430 may be performed by the demodulator 260 (FIG. 2), or the processor 210 illustrated in FIG. 2 (for example, in implementations that may not have a separate demodulator component). At block 1440, the process 1400 compares in parallel a plurality of circularly rotated versions of a target sequence of bits to generate a comparison result. In some implementations, the functionality of block 1440 may be performed by the comparison circuit 270 illustrated in FIG. 2, or the processor 210. At block 1450, if the comparison result indicates a match, the process 1400 outputs a signals indicating a match between the target sequence of bits and the demodulated sequences of bit. In some implementations, the functionality of block 14500 may be performed by the comparison circuit 270 illustrated in FIG. 2, or the processor 210.

Figure 15:
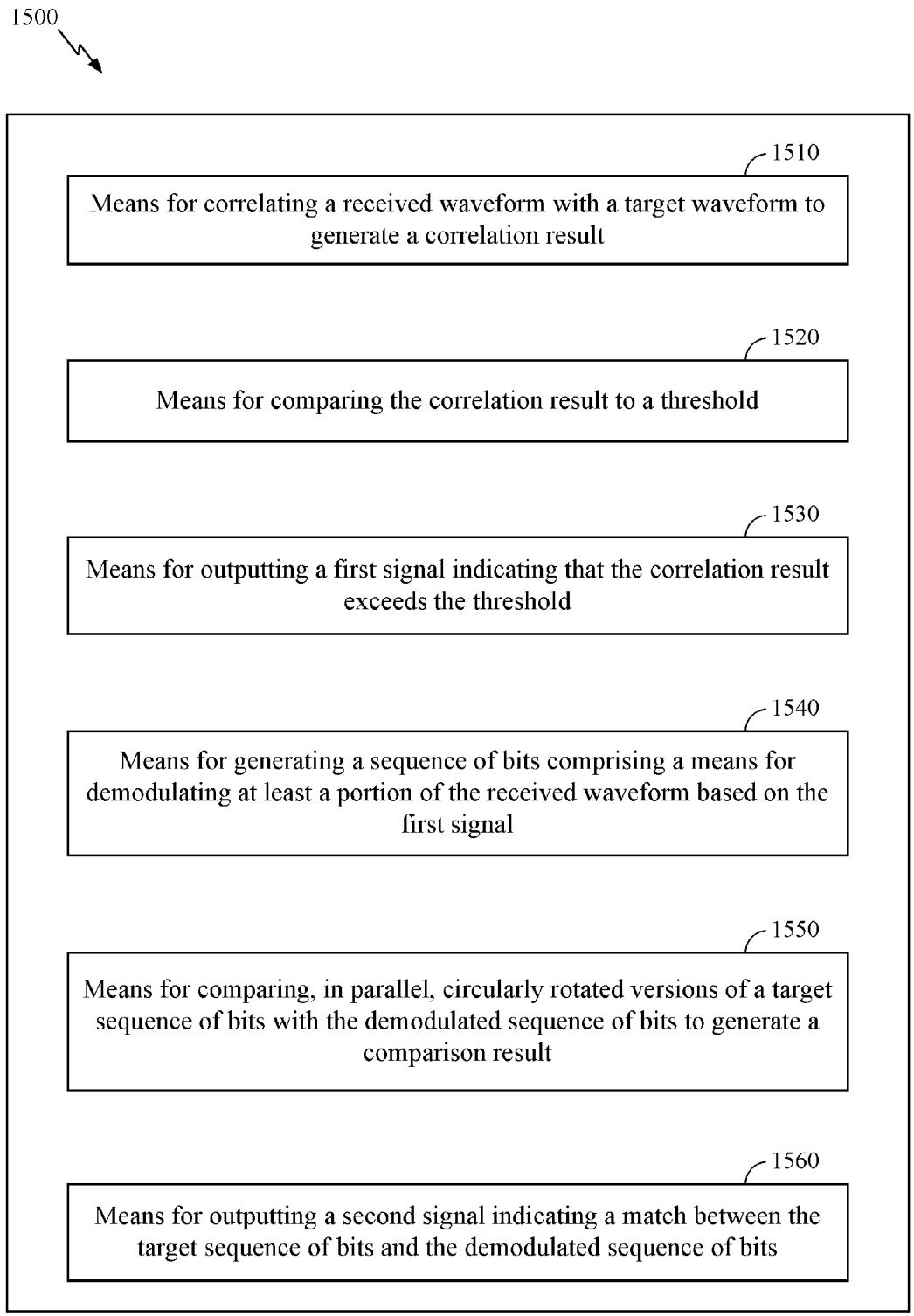
FIG. 15 illustrates a block diagram of an example of a wireless device configured to detect a trigger waveform.

FIG. 15 illustrates a block diagram of an example of a wireless device 1500 configured to detect a trigger waveform. The apparatus may include means 1510 for correlating a received waveform with a target waveform to generate a correlation result. In some implementations, the means for correlating may be the correlation circuit 250 (FIG. 2). The apparatus may also include a means 1520 for comparing the correlation result to a threshold. The apparatus may also include a means 1530 for outputting a first signal indicating that the correlation result exceeds the threshold. The correlating means 1510, the correlation result comparing means 1520, and the outputting a first signal means 1530 each may comprise any type of correlation circuit, correlator, or processor, as well as memory including special purpose hardware, a processor, or memory. In some implementations, the means for comparing a correlation result and the means for outputting a first signal may be the correlation circuit 250.

The apparatus may also include a means 1540 for generating a sequence of bits comprising a means for demodulating at least a portion of the received waveform based on the first signal. The generating means with demodulating means 1540 comprises any type of demodulation circuit, processor, or signal processor. In some implementations, the means for generating a sequence of bits and the means for demodulating may be the demodulator 260 illustrated in FIG. 2.

The apparatus may also include a means 1550 for comparing, in parallel, circularly rotated versions of a target sequence of bits with the demodulated sequence of bits to generate a comparison result. The parallel comparing means 1550 may comprise any type of comparison circuit, comparator, processor, or memory. The apparatus may also include means 1560 for outputting a second signal indicating a match between the target sequence of bits and the demodulated sequence of bits. The second signal outputting means 1560 may comprise any type of trigger detection circuit, processor, or circuit. In some implementations, the comparing means 1550 and the second signal outputting means 1560 may be the comparison circuit 270.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a correlation circuit configured to correlate a received waveform with a target waveform, the correlation circuit further configured to compare a result of the correlation to a threshold and output a first signal when the result of the correlation exceeds the threshold;
a demodulation circuit configured to generate a sequence of bits by demodulating at least a portion of the received waveform in response to receiving the first signal;
a comparison circuit configured to compare, in parallel, a plurality of circularly rotated versions of a target sequence of bits with the demodulated sequence of bits; and
a trigger detection circuit configured to combine the results of the comparisons and output a second signal when the combined comparisons indicate that the demodulated sequence of bits corresponds to the target sequence of bits.

2. The apparatus of claim 1, wherein the comparison circuit is configured to compare, in parallel, circularly rotated versions of the target sequences of bits rotated by a shift value resulting from an integer multiple of the length of the target sequence of bits divided by the number of rotated versions of the target sequence of bits.

3. The apparatus of claim 1, wherein the comparison circuit comprises a comparator configured to compare each of the plurality of circularly rotated versions of the target sequence of bits with the demodulated sequence of bits.

4. The apparatus of claim 1, wherein the comparison circuit comprises a plurality of comparators, wherein each of the plurality of comparators compares a circularly rotated version of the target sequence of bits with the demodulated bits.

5. The apparatus of claim 1, wherein the correlation circuit comprises a correlator configured to use time sharing to correlate a plurality of circularly rotated versions of the target waveform with the received waveform.

6. The apparatus of claim 1, wherein the correlation circuit comprises a plurality of correlators, wherein each of the plurality of correlators correlates a circularly rotated version of the target waveform with the received waveform.

7. The apparatus of claim 6, wherein each correlator of the plurality of correlators correlates the received waveform with a circularly rotated version of the targeted waveform, wherein the circularly rotated waveforms are rotated by an integer multiple of the length of the target waveform divided by the number of correlators.

8. The apparatus of claim 1, further comprising a scanning circuit that scans a plurality of carrier frequencies during a time window for a trigger waveform, the scanning circuit further configured to receive a waveform centered at one of the carrier frequencies.

9. The apparatus of claim 1, further comprising a transmitter configured to transmit a beacon in response to the second signal.

10. The apparatus of claim 1, wherein the received waveform conforms to a wireless communications protocol wherein a trigger waveform from an initiator device to a target device is repeatedly transmitted.

11. The apparatus of claim 10, wherein the wireless communications protocol is Bluetooth or Wi-Fi.

12. The apparatus of claim 1, wherein the target sequence of bits corresponds to a sequence of low latency reconnection bits associated with the apparatus.

13. The apparatus of claim 1, wherein the target sequence of bits comprises 32 bits.

14. The apparatus of claim 1, wherein the comparison circuit is configured to compare four rotated versions of the target sequence with the demodulated bits.

15. A method for wireless communications, the method comprising:
correlating, by a correlation circuit, a received waveform with a target waveform to generate a correlation result;
comparing, by the correlation circuit, the correlation result to a threshold;
if the correlation result exceeds the threshold, demodulating, by a demodulation circuit, at least a portion of the waveform to generate a sequence of bits;
comparing, in parallel, by a comparison circuit, a plurality of circularly rotated versions of a target sequence of bits with the demodulated sequence of bits to generate a comparison result; and
outputting, by a trigger detection circuit, a signal indicating a match between the target sequence of bits and the demodulated sequence of bits.

16. The method of claim 15, wherein comparing a plurality of rotated versions of the target sequences of bits with the demodulated sequence of bits comprises comparing rotated versions that are rotated by an integer multiple of the length of the target sequence of bits divided by the number of rotated versions of the target sequence of bits.

17. The method of claim 10, wherein correlating the received waveform with the target waveform comprises correlating a plurality of circularly rotated versions of the target waveform with the received waveform.

18. The method of claim 10, further comprising scanning, by a scanning circuit, a plurality of carrier frequencies during a time window for a trigger waveform; and receiving a waveform centered at one of the carrier frequencies.

19. The method of claim 10, further comprising transmitting a beacon in response to the signal.

20. The method of claim 10, wherein the received waveform conforms to a wireless communications protocol wherein a trigger waveform from an initiator device to a target device is repeatedly transmitted.

21. The method of claim 20, wherein the wireless communications protocol is one of Bluetooth and Wi-Fi.

22. An apparatus for wireless communication, comprising:
means for correlating a received waveform with a target waveform to generate a correlation result;
means for comparing the correlation result to a threshold;
means for outputting a first signal indicating that the correlation result exceeds the threshold;
means for generating a sequence of bits, comprising a means for demodulating at least a portion of the received waveform based on the first signal;
means for comparing, in parallel, a plurality of circularly rotated versions of a target sequence of bits with the demodulated sequence of bits to generate a comparison result; and
means for outputting a second signal indicating a match between the target sequence of bits and the demodulated sequence of bits.

23. The apparatus of claim 22, wherein the correlating means comprises a correlation circuit, wherein the correlation result comparing means comprises the correlation circuit, wherein the first signal outputting means comprises the correlation circuit, wherein the generating means comprises a demodulation circuit, wherein the demodulating means comprises the demodulation circuit, wherein the parallel comparing means comprises a comparison circuit, and wherein the outputting means comprises a trigger detection circuit.

24. The apparatus of claim 22, wherein the comparing means is configured to compare rotated versions of the target sequences of bits rotated by an integer multiple of the length of the target sequence of bits divided by the number of rotated versions of the target sequence of bits.

25. The apparatus of claim 22, wherein the correlating means comprises means for correlating in parallel a plurality of circularly rotated versions of the target waveform with the received waveform.

26. The apparatus of claim 22, further comprising means for scanning configured to:
   scan a plurality of carrier frequencies during a time window for a trigger waveform; and
   receive a waveform centered at one of the carrier frequencies.

27. The apparatus of claim 22, further comprising means for transmitting configured to transmit a beacon in response to the signal.

28. The apparatus of claim 22, wherein the received waveform conforms to a wireless communications protocol wherein a trigger waveform from an initiator device to a target device is repeatedly transmitted.

29. The apparatus of claim 10, wherein the wireless communications protocol is one of one of Bluetooth and Wi-Fi.

30. A computer program product comprising a non-transitory computer readable medium encoded thereon with instructions that when executed cause an apparatus to perform a method of determining if a certain signal has been received, said method comprising:
   correlating a received waveform with a target waveform to generate a correlation result;
   comparing the correlation result to a threshold;
   if the correlation result exceeds the threshold, demodulating at least a portion of the waveform to generate a sequence of bits;
   comparing, in parallel, a plurality of circularly rotated versions of a target sequence of bits with the demodulated sequence of bits to generate a comparison result; and
   outputting a second signal indicating a match between the target sequence of bits and the demodulated sequence of bits.

31. A processor configured to determine if a certain signal has been received, comprising:
   a correlation circuit configured to correlate a received waveform with a target waveform, the correlation circuit further configured to compare a result of the correlation to a threshold and output a first signal when the result of the correlation exceeds the threshold;
   a demodulation circuit configured to generate a sequence of bits by demodulating at least a portion of the received waveform in response to receiving the first signal;
   a comparison circuit configured to compare, in parallel, a plurality of circularly rotated versions of a target sequence of bits with the demodulated sequence of bits; and
   a trigger detection circuit configured to combine the results of the comparisons and output a second signal when the combined comparisons indicate that the demodulated sequence of bits corresponds to the target sequence of bits.

* * * * *

UNITED STATES PATENT AND TRADEMARK OFFICE
CERTIFICATE OF CORRECTION

| | | |
|---|---|---|
| PATENT NO. | : 8,929,490 B1 | Page 1 of 1 |
| APPLICATION NO. | : 14/034246 | |
| DATED | : January 6, 2015 | |
| INVENTOR(S) | : Daniel Jose Fernandes Barros | |

It is certified that error appears in the above-identified patent and that said Letters Patent is hereby corrected as shown below:

In the Drawings

Sheet 10 of 15 (Reference Numeral 262, FIG. 10) at line 2, Change "Initiailizer" to --Initializer--.

In the Specification

In column 6 at line 28, Change "innovations" to --innovations.--.

In column 12 at line 55 (approx.), Change "$x[n] = [n]\sqrt{P}e^{j\phi[n]}$" to --$x[n] = \sqrt{P}e^{j\phi[n]}$--.

In column 14 at line 6, Change "for" to --for $d_{min}=1$.--.

In column 15 at line 22, Change "bits" to --bits.--.

In the Claims

In column 23 at line 20, In Claim 29, change "one of one of" to --one of--.

Signed and Sealed this
Twenty-second Day of September, 2015

Michelle K. Lee
*Director of the United States Patent and Trademark Office*